United States Patent
Minborg et al.

(10) Patent No.: US 7,787,872 B2
(45) Date of Patent: *Aug. 31, 2010

(54) METHOD AND APPARATUS FOR EVENT-TRIGGERED EXCHANGE OF LOCATION-BASED INFORMATION IN A COMMUNICATIONS NETWORK

(75) Inventors: Per-Åke Minborg, Stora Hoga (SE); Timo Pohjanvuori, Göteborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 11/745,689

(22) Filed: May 8, 2007

(65) Prior Publication Data

US 2007/0259655 A1 Nov. 8, 2007

Related U.S. Application Data

(63) Continuation of application No. 09/766,731, filed on Jan. 19, 2001, now Pat. No. 7,248,862.

(60) Provisional application No. 60/176,806, filed on Jan. 19, 2000.

(30) Foreign Application Priority Data

Sep. 3, 2000 (SE) .................... PCT/SE00/01689

(51) Int. Cl.
*H04M 3/42* (2006.01)
(52) U.S. Cl. ..................... 455/415; 455/414.1
(58) Field of Classification Search ............ 455/415, 455/445, 462, 418, 419, 414.1, 575, 344, 455/351, 556; 379/218.01, 211.01
See application file for complete search history.

(56) References Cited

U.S. PATENT DOCUMENTS

| | | | |
|---|---|---|---|
| 5,157,710 | A | 10/1992 | Itoh |
| 5,289,530 | A | 2/1994 | Reese |
| 5,305,372 | A | 4/1994 | Tomiyori |
| 5,329,591 | A | 7/1994 | Magrill |
| 5,398,279 | A | 3/1995 | Frain |

(Continued)

FOREIGN PATENT DOCUMENTS

DE 19737126 3/1999

(Continued)

OTHER PUBLICATIONS

Smart Messaging Specification, Revision 3.0.0, Nokia Mobile Phones Ltd., Dec. 18, 2000.

(Continued)

*Primary Examiner*—Melody Mehrpour
(74) *Attorney, Agent, or Firm*—Coats & Bennett, P.L.L.C.

(57) ABSTRACT

A method and system in which data objects including area-specific information are provided to a mobile communication device are disclosed. The device indicates a present physical location to a data object server, and the data object server returns a data object, such as an internet web page, WAP page, or other information, which contains information specific to the area in which the device is presently located. The areas for which data objects are provided can be independent of the structure of the communication network serving the mobile communication device.

37 Claims, 13 Drawing Sheets

U.S. PATENT DOCUMENTS

| | | | |
|---|---|---|---|
| 5,533,922 A | 7/1996 | Yamaharu | |
| 5,561,704 A | 10/1996 | Salimando | |
| 5,588,042 A | 12/1996 | Comer | |
| 5,613,205 A | 3/1997 | Dufour | |
| 5,689,563 A | 11/1997 | Brown et al. | |
| 5,708,702 A | 1/1998 | De Paul et al. | |
| 5,712,979 A | 1/1998 | Graber et al. | |
| 5,724,406 A | 3/1998 | Juster | |
| 5,757,894 A | 5/1998 | Kay et al. | |
| 5,761,279 A | 6/1998 | Bierman et al. | |
| 5,771,279 A | 6/1998 | Cheston et al. | |
| 5,805,823 A | 9/1998 | Seitz | |
| 5,812,667 A | 9/1998 | Miki et al. | |
| 5,812,950 A | 9/1998 | Tom | |
| 5,840,433 A | 11/1998 | Juma | |
| 5,844,978 A | 12/1998 | Reuss et al. | |
| 5,850,433 A | 12/1998 | Rondeau | |
| 5,854,976 A | 12/1998 | Garcia Aguilera et al. | |
| 5,878,347 A | 3/1999 | Joensuu et al. | |
| 5,889,861 A | 3/1999 | Ohashi et al. | |
| 5,893,031 A | 4/1999 | Hoogerwerf et al. | |
| 5,895,471 A | 4/1999 | King et al. | |
| 5,901,352 A | 5/1999 | St-Pierre et al. | |
| 5,920,815 A | 7/1999 | Akhavan | |
| 5,930,699 A | 7/1999 | Bhatia | |
| 5,930,703 A | 7/1999 | Cairns | |
| 5,933,486 A | 8/1999 | Norby et al. | |
| 5,940,598 A | 8/1999 | Strauss et al. | |
| 5,946,684 A | 8/1999 | Lund | |
| 5,948,066 A | 9/1999 | Whalen et al. | |
| 5,949,763 A | 9/1999 | Lund | |
| 5,950,121 A | 9/1999 | Kaminsky et al. | |
| 5,950,137 A | 9/1999 | Kim | |
| 5,952,969 A | 9/1999 | Hagerman et al. | |
| 5,963,626 A | 10/1999 | Nabkel | |
| 5,970,414 A | 10/1999 | Bi et al. | |
| 5,978,806 A | 11/1999 | Lund | |
| 5,991,749 A | 11/1999 | Morrill, Jr. | |
| 5,999,806 A | 12/1999 | Kaplan et al. | |
| 6,002,749 A | 12/1999 | Hansen et al. | |
| 6,005,870 A | 12/1999 | Leung et al. | |
| 6,006,097 A | 12/1999 | Hornfeldt et al. | |
| 6,006,251 A | 12/1999 | Toyouchi et al. | |
| 6,009,091 A | 12/1999 | Stewart et al. | |
| 6,014,090 A | 1/2000 | Rosen et al. | |
| 6,016,349 A | 1/2000 | Musa | |
| 6,018,654 A | 1/2000 | Valentine et al. | |
| 6,028,914 A | 2/2000 | Lin et al. | |
| 6,031,836 A | 2/2000 | Haserodt | |
| 6,047,174 A | 4/2000 | Frederick | |
| 6,049,713 A * | 4/2000 | Tran et al. | 455/415 |
| 6,058,301 A | 5/2000 | Daniels | |
| 6,058,310 A | 5/2000 | Tokuyoshi | |
| 6,064,732 A | 5/2000 | Pezzullo et al. | |
| 6,064,887 A | 5/2000 | Kallioniemi et al. | |
| 6,067,546 A | 5/2000 | Lund | |
| 6,072,875 A | 6/2000 | Tsudik | |
| 6,075,993 A | 6/2000 | Kawamoto | |
| 6,078,581 A | 6/2000 | Shtivelman et al. | |
| 6,081,705 A | 6/2000 | Houde et al. | |
| 6,085,224 A | 7/2000 | Wagner | |
| 6,088,587 A | 7/2000 | Abbadessa | |
| 6,088,598 A | 7/2000 | Marsolais | |
| 6,091,808 A | 7/2000 | Wood et al. | |
| 6,091,945 A | 7/2000 | Oka | |
| 6,091,946 A | 7/2000 | Ahvenainen | |
| 6,094,168 A | 7/2000 | Duffett-Smith et al. | |
| 6,097,793 A | 8/2000 | Jandel | |
| 6,097,942 A | 8/2000 | Laiho | |
| 6,112,078 A | 8/2000 | Sormunen et al. | |
| 6,115,754 A | 9/2000 | Landgren | |
| 6,119,155 A | 9/2000 | Rossmann et al. | |
| 6,131,095 A | 10/2000 | Low et al. | |
| 6,134,450 A | 10/2000 | Nordeman | |
| 6,138,158 A | 10/2000 | Boyle et al. | |
| 6,141,413 A | 10/2000 | Waldner et al. | |
| 6,154,646 A | 11/2000 | Tran et al. | |
| 6,157,708 A | 12/2000 | Gordon | |
| 6,157,841 A | 12/2000 | Bolduc et al. | |
| 6,161,008 A | 12/2000 | Lee et al. | |
| 6,161,134 A | 12/2000 | Wang et al. | |
| 6,163,598 A | 12/2000 | Moore | |
| 6,163,691 A | 12/2000 | Buettner et al. | |
| 6,163,794 A | 12/2000 | Lange et al. | |
| 6,169,897 B1 | 1/2001 | Kariya | |
| 6,173,048 B1 | 1/2001 | Malik | |
| 6,173,316 B1 | 1/2001 | De Boor et al. | |
| 6,175,741 B1 | 1/2001 | Alperovich | |
| 6,181,928 B1 | 1/2001 | Moon | |
| 6,181,935 B1 | 1/2001 | Gossman et al. | |
| 6,185,184 B1 | 2/2001 | Mattaway et al. | |
| 6,188,756 B1 | 2/2001 | Mashinsky | |
| 6,188,909 B1 | 2/2001 | Alanara et al. | |
| 6,192,123 B1 | 2/2001 | Grunsted et al. | |
| 6,192,251 B1 | 2/2001 | Jyogataki et al. | |
| 6,192,258 B1 | 2/2001 | Kamada et al. | |
| 6,199,099 B1 | 3/2001 | Gershman et al. | |
| 6,202,023 B1 | 3/2001 | Hancock et al. | |
| 6,205,204 B1 | 3/2001 | Morganstein et al. | |
| 6,208,659 B1 | 3/2001 | Govindarajan et al. | |
| 6,215,790 B1 | 4/2001 | Voit et al. | |
| 6,219,413 B1 | 4/2001 | Burg | |
| 6,219,694 B1 | 4/2001 | Lazaridis et al. | |
| 6,226,367 B1 | 5/2001 | Smith et al. | |
| 6,226,668 B1 | 5/2001 | Silverman | |
| 6,233,234 B1 | 5/2001 | Curry et al. | |
| 6,233,608 B1 | 5/2001 | Laursen et al. | |
| 6,240,174 B1 | 5/2001 | Silver | |
| 6,243,443 B1 | 6/2001 | Low et al. | |
| 6,243,453 B1 | 6/2001 | Bunch et al. | |
| 6,252,544 B1 | 6/2001 | Hoffberg | |
| 6,253,234 B1 | 6/2001 | Hunt et al. | |
| 6,256,498 B1 * | 7/2001 | Ludwig | 455/433 |
| 6,263,058 B1 | 7/2001 | Lautenschlager et al. | |
| 6,289,090 B1 | 9/2001 | Tessler et al. | |
| 6,301,609 B1 | 10/2001 | Aravamundan et al. | |
| 6,311,057 B1 | 10/2001 | Barvesten | |
| 6,317,594 B1 | 11/2001 | Gossman et al. | |
| 6,320,946 B1 | 11/2001 | Enzmann et al. | |
| 6,324,542 B1 | 11/2001 | Wright et al. | |
| 6,327,355 B1 | 12/2001 | Britt | |
| 6,336,137 B1 | 1/2002 | Lee et al. | |
| 6,353,660 B1 | 3/2002 | Burger et al. | |
| 6,356,761 B1 * | 3/2002 | Huttunen et al. | 455/456.1 |
| 6,356,956 B1 | 3/2002 | Deo et al. | |
| 6,370,137 B1 | 4/2002 | Lund | |
| 6,381,465 B1 | 4/2002 | Chern et al. | |
| 6,411,704 B1 | 6/2002 | Pelletier et al. | |
| 6,424,828 B1 | 7/2002 | Collins et al. | |
| 6,438,599 B1 | 8/2002 | Chack | |
| 6,442,241 B1 | 8/2002 | Tsumpes | |
| 6,469,998 B1 | 10/2002 | Burgaleta Salinas et al. | |
| 6,470,447 B1 | 10/2002 | Lambert et al. | |
| 6,480,484 B2 | 11/2002 | Morton | |
| 6,480,883 B1 | 11/2002 | Tsutsumitake | |
| 6,493,324 B1 | 12/2002 | Truetken | |
| 6,496,579 B1 | 12/2002 | Mashinsky | |
| 6,507,908 B1 | 1/2003 | Caronni | |
| 6,522,738 B1 | 2/2003 | Cruickshank et al. | |
| 6,522,875 B1 | 2/2003 | Dowling et al. | |
| 6,539,538 B1 | 3/2003 | Brewster et al. | |
| 6,549,773 B1 | 4/2003 | Linden et al. | |
| 6,560,456 B1 | 5/2003 | Lohtia et al. | |
| 6,625,644 B1 | 9/2003 | Zaras | |

| | | | |
|---|---|---|---|
| 6,629,143 B1 | 9/2003 | Pang | |
| 6,640,240 B1 | 10/2003 | Hoffman et al. | |
| 6,647,108 B1 | 11/2003 | Wurster et al. | |
| 6,671,508 B1 | 12/2003 | Mitsuoka et al. | |
| 6,671,522 B1 | 12/2003 | Beaudou | |
| 6,687,340 B1 | 2/2004 | Goldberg et al. | |
| 6,718,178 B1 | 4/2004 | Sladek et al. | |
| 6,728,360 B1 | 4/2004 | Brennan | |
| 6,744,759 B1 | 6/2004 | Sidhu et al. | |
| 6,751,211 B1 | 6/2004 | Chack | |
| 6,781,972 B1 | 8/2004 | Anderlind et al. | |
| 6,788,774 B1 | 9/2004 | Caldwell et al. | |
| 6,792,607 B1 | 9/2004 | Burd et al. | |
| 6,795,711 B1 | 9/2004 | Sivula | |
| 6,798,868 B1 | 9/2004 | Montgomery et al. | |
| 6,816,878 B1 | 11/2004 | Zimmers et al. | |
| 6,826,403 B1 | 11/2004 | Minborg et al. | |
| 6,847,703 B2 | 1/2005 | Shibuya | |
| 6,889,321 B1 | 5/2005 | Kung et al. | |
| 6,895,237 B1 | 5/2005 | Scott | |
| 6,919,814 B1 | 7/2005 | Holmqvist | |
| 6,922,721 B1 | 7/2005 | Minborg et al. | |
| 6,937,597 B1 | 8/2005 | Rosenberg et al. | |
| 6,941,374 B1 | 9/2005 | Kronz | |
| 6,959,193 B1 | 10/2005 | Kim | |
| 6,978,005 B2 | 12/2005 | Pernu et al. | |
| 6,983,138 B1 | 1/2006 | Helferich | |
| 6,996,072 B1 | 2/2006 | Minborg | |
| 7,031,441 B1 | 4/2006 | Edwards et al. | |
| 7,058,686 B2 | 6/2006 | Jin | |
| 7,110,525 B1* | 9/2006 | Heller et al. | 379/265.11 |
| 7,177,897 B2 | 2/2007 | Manukyan | |
| 7,221,741 B1* | 5/2007 | Suder et al. | 379/88.21 |
| 7,248,862 B2* | 7/2007 | Minborg et al. | 455/415 |
| 7,269,253 B1* | 9/2007 | Wu et al. | 379/265.11 |
| 7,313,782 B2 | 12/2007 | Lurie et al. | |
| 7,409,701 B1 | 8/2008 | Tiphane | |
| 7,512,692 B2* | 3/2009 | Minborg et al. | 709/227 |
| 2001/0040621 A1 | 11/2001 | Gerszberg et al. | |
| 2002/0059272 A1 | 5/2002 | Porter | |
| 2002/0068550 A1 | 6/2002 | Tejada | |
| 2002/0107906 A1 | 8/2002 | Brockbank | |
| 2002/0128002 A1 | 9/2002 | Vu | |
| 2003/0050052 A1 | 3/2003 | Minborg et al. | |
| 2003/0060211 A1* | 3/2003 | Chern et al. | 455/456 |
| 2003/0135586 A1 | 7/2003 | Minborg et al. | |
| 2003/0174684 A1 | 9/2003 | Pohjanvuori et al. | |
| 2004/0062374 A1* | 4/2004 | Lund | 379/218.01 |
| 2004/0236792 A1 | 11/2004 | Celik | |
| 2007/0293205 A1* | 12/2007 | Henderson | 455/415 |

FOREIGN PATENT DOCUMENTS

| | | |
|---|---|---|
| EP | 0 484 067 A2 | 10/1991 |
| EP | 0869688 | 10/1996 |
| EP | 0 851 647 | 7/1998 |
| EP | 0 853 287 | 7/1998 |
| EP | 0 858 202 | 8/1998 |
| EP | 0 944 203 | 9/1999 |
| EP | 0 971 513 A2 | 1/2000 |
| EP | 1041808 | 10/2000 |
| EP | 1 069 789 | 1/2001 |
| EP | 1 089 519 | 4/2001 |
| EP | 1 111 505 | 6/2001 |
| EP | 1 128 647 A2 | 8/2001 |
| GB | 2 338 150 | 8/1999 |
| WO | WO 94/23523 | 10/1994 |
| WO | WO 97/07644 | 2/1997 |
| WO | WO 97/13380 | 4/1997 |
| WO | WO 97/20441 | 6/1997 |
| WO | WO 97/22211 | 6/1997 |
| WO | WO 97/22212 | 6/1997 |
| WO | WO 97/31490 | 8/1997 |
| WO | WO 97/31491 | 8/1997 |
| WO | WO 98/11744 | 3/1998 |
| WO | WO 98/18283 | 4/1998 |
| WO | WO 98/19445 | 7/1998 |
| WO | WO 98/51056 | 11/1998 |
| WO | WO 98/56159 | 12/1998 |
| WO | WO 98/56197 | 12/1998 |
| WO | WO 99/00751 | 1/1999 |
| WO | WO 99/11078 | 3/1999 |
| WO | WO 99/35595 | 7/1999 |
| WO | 9953621 | 10/1999 |
| WO | WO 99/55107 | 10/1999 |
| WO | WO 00/04730 | 1/2000 |
| WO | WO 00/38458 | 6/2000 |
| WO | WO 00/39666 | 7/2000 |
| WO | WO 00/64110 | 10/2000 |
| WO | WO 00/77662 A2 | 12/2000 |
| WO | WO 00/78016 | 12/2000 |
| WO | WO 01/01077 | 1/2001 |
| WO | WO 01/05109 | 1/2001 |
| WO | WO 01/20475 | 3/2001 |
| WO | WO 01/54364 | 7/2001 |
| WO | WO 01/54373 | 7/2001 |
| WO | WO 00/46697 | 8/2001 |

OTHER PUBLICATIONS

Digital Cellular Telecommunications System (Phase 2), Technical Realization of the Short Message Service (SMS) Point-to-Point (GSM03.40), ETSI, ETS 300 536, Fourth Edition, Oct. 1996.
PCT—International Search Report dated Jun. 13, 2001, for Application No. PCT/SE01/00079, Filed Jan. 18, 2001.
PCT—International Search Report dated Jun. 13, 2001, for Application No. PCT/SE01/00094, Filed Jan. 19, 2001.
PCT—International Search Report dated Jul. 6, 2001, for Application No. PCT/SE01/00093, filed Jan. 19, 2001.
Lawrence Harte, et al., GSM Superphones, Table of Contents and Chapter 1, p. xi-xxii and 1-22, McGraw-Hill, 1999.
Christian Bettstetter, et al., "GSM Phase 2+ General Packet Radio Service GPRS: Architecture, Protocols, and Air Interface", IEEE Communications Surveys, <<http://www.comsoc.org/pubs/surveys>>, 13 pages, Third Quarter 1999, vol. 2, No. 3.
PCT—International Search Report for PCT/SE01/00071.
PCT—International Search Report for PCT/SE01/00080.
ETSI TS 101 267 (V.8.8.0) Technical Specification for Digital Telecommunications System (Phase 2+), Specification of the SIM Application Toolkit for the Subcriber Identity Module—Mobile Equipment (SIM—ME interface) (Global System for Mobile Communications: 2001).
International Search Report for PCT/SE00/01689, issued Dec. 8, 2000, four pages.
Schulzrinne, "A Comprehensive Multimedia Control Architecture for the Internet," Dept. of Computer Science, Columbia University, New York, NY, IEEE No. 0-7803-3799-9/97, 1997, p. 65-76.
Dalgic, et al., "True Number Portability and Advanced Call Screening in a SIP-Based IP Telephony System," IEEE Communications magazine, p. 96-101, Jul. 1999.
Schulzrinee & Rosenberg, "Signalling for Internet Telephony," Columbia University and Bell Laboratories, respectively, 10 pages.
Commonly Assigned U.S. Appl. No. 10/169,414, entitled "Method and Apparatus for Exchange of Information in a Communication System", filed Sep. 4, 2002.
Commonly Assigned U.S. Appl. No. 10/169,610, entitled "System and Method for Retrieval of Data Objects in Connection with Voice Communication Session Between Calling and Called Parties", filed Aug. 28, 2002.
Commonly Assigned U.S. Appl. No. 11/272,059, entitled "Method and Apparatus for Exchange of Information in a Communication System", filed Nov. 14, 2005.
Commonly Assigned U.S. Appl. No. 11/274,173, entitled "Method and Apparatus for Exchange of Information in a Communication System", filed Nov. 16, 2005.

P. Bastide, Excerpt Doctoral Thesis, Academie de Montpellier, Changes in . . . of Theobroma Cacao L., pp. 1-8 (Jul. 8, 1987).

J. Clapperton et al., "Polyphenols and Cocoa Flavour" Presented at XVI Intl. Conf. Group Polyphenols, Lisbon, Portugal Jul. 13-16, 1992 Tome II, vol. 16 pp.

W.G.C. Forsyth, "Caffeine in Cacao Beans," Nature 4288:33 (1952).

W.G.C. Forsyth "Leucocyanidin and Epicatechin," Nature 172:726-727 (1953).

W.G.C. Forsyth "Cacao Polyphenolic Substances 4, The Anthocyanin Pigments," Biochem J. 65:177-179 (1956).

S. Shamsuddin et al., Proc. Symp. Cacao Biotechnol., "Qualitative and Quantiative Content Measurement of Cacao Bean Fermentation." pp. 55-76 (1986).

PCT—International Search Report dated Aug. 5, 2008, for Application No. PCT/US2008/054982, Filed Feb. 26, 2008.

* cited by examiner

METHOD AND APPARATUS FOR EVENT-TRIGGERED EXCHANGE OF LOCATION-BASED INFORMATION IN A COMMUNICATIONS NETWORK

CROSS-REFERENCE TO RELATED APPLICATIONS

This application is a continuation of U.S. patent application Ser. No. 09/766,731 that was filed on Jan. 19, 2001 now U.S. Pat. No. 7,248,862 and claims priority from PCT/SE00/01689 filed on Sep. 3, 2000, which in turn claims priority from U.S. Provisional Application Ser. No. 60/176,806 filed on Jan. 19, 2000 and U.S. patent application Ser. No. 09/644,307 filed Aug. 23, 2000 and issued as U.S. Pat. No. 6,996,072 on Feb. 7, 2006.

BACKGROUND OF THE INVENTION

The present invention relates generally to a method and apparatus for exchanging information in a communication system. More specifically, the invention relates to a communication system, which connects to a private or public data communication network and to a public or private telecommunication network.

The present evolution of data communication is such that more and more users have access to the Internet worldwide. The Internet has become both a source of knowledge but also a market place for business, and it is attracting more and more users. Currently there is significant pressure on the data-communications industry to provide solutions that allow everyone to gain access to Internet. Broadband solutions are continuously developed and both local as well as national access networks are being planned and launched. The presently most common method of modem access through a telecommunications network (e.g., the Public Switched Telecommunication Network, PSTN provider) is being replaced by other ways of access with the possibility of higher data rates, e.g., through electric power and cable TV providers.

At the same time, the telecommunications industry is struggling with another battle: that of providing mobility to each and every user. Traditionally, telecommunication has been focused on voice communication. With the increase of data communication however, other demands are arising (e.g., higher data rate transfer), but also new possibilities. Evolutions of mobile systems are presently in a period when more and more packet-based systems will be deployed. Packet switched systems, in contrast to circuit switched systems, have certain advantages in the transfer of data. In a packet switched system, a user uses a transmission resource only when system control signaling or user information is transmitted. In a circuit switched system, a user is allocated a transmission resource continuously, even though no current transfer is active. Circuit switched systems have some obvious advantages in real-time voice communication, since it is difficult to predict the communication. For data communication, it is not as important to predict the transmission resources required, since the demands on delay and delay variations are not as crucial to the communication quality as for voice. It is therefore possible to allow more users onto the transmission resources by allowing usage thereof only when there is something to transmit and leave the channel available for additional users otherwise.

One such system is the packet data evolution of the mobile communication system pursuant to the ETSI GSM specification, called General Packet Radio Service (GPRS). With GPRS, higher bit rates and more users may be allowed than what is possible today, when data communication is deployed on a circuit switched channel. GPRS is a step towards mobility for data communication users, in contrast to GSM, which is optimized for mobility for "traditional" telecommunication users, i.e., real-time voice communication users.

The data-communication run over the telecommunications networks today is usually initiated by an access to an Internet- or a mail server. A user logs on to a distant server and accesses the data-communications network through e.g., modem pools.

The user dials up the modem pool and is therefrom connected to a server, from which access can be made to both local as well as global networks. Browsers such as Microsoft Explorer or Netscape Navigator are used to navigate on the Internet and switch between Internet pages or addresses. Users and institutions usually design their own data objects, or homepages, on an internal or external network that provides personal information or any other kind of information. Once connected to the data network a user may access these data objects by entering the correct address. The address is often selected by combining a node name in the network (e.g. server name) and an arbitrary text string. Typically, it is not trivial to find a desired data object, since the text strings and server names are not obvious.

Addressing in a telecommunications network, e.g., when engaging in a voice communication, is usually performed by entering a telephone number on a User Equipment (UE), such as a mobile telephone. A telephone number is a, world-wide, unique addressing string. A calling party (A-party) dials the addressing string (B-number) to the called party (B-party). Dependent on what type of network the A-party is a subscriber on, the call request is routed through one or several public telecommunication networks to the correct addressee and the communication may begin.

The above principle also applies when a user wishes to connect to the Internet from a computer connected to a telecommunications network. The user connects to a data communications network by dialing a B-number to a modem pool, from which accessing the data-communications network is possible. There are no information or interaction possibilities with the called server other than this access opportunity.

A mobile terminal, or mobile communication device, in current and future mobile communication systems (e.g., GSM and UMTS) typically has the ability to identify its physical location. Location identification is well-known, and can be achieved by any of a number of methods, such as those described in U.S. Pat. Nos. 6,094,168; 6,075,993; 6,058,310; 6,009,091; 6,006,097; 5,952,969; 5,950,137; 5,970,414; and 5,613,205. Such methods include GPS, base-station triangulation, and "cell-belonging" identity. Most location-determining methods rely on data or communication within the PLMN operator (e.g., triangulation) and/or may be restricted by the underlying radio cell planning structure (e.g., cell belonging). Thus, the PLMN operator effectively "owns" the knowledge of a mobile terminal's location, thereby locking out external information providers that would like to directly offer services based on a mobile terminal's location.

For example, U.S. Pat. No. 6,088,598 to Marsolais discloses a method and system for displaying greetings in a mobile radio communications system. The greetings identify location-based services. The system identifies a plurality of service zones in the system, and transmits predefined services to mobile terminals when located in the service zones. The system transmits, from each base station, local zone profile information to each mobile terminal located in those service zones. Each mobile terminal stores subscriber zone profile information for which that mobile terminal can receive location-based services. The mobile terminal also stores an associated greeting for each zone. The mobile terminal compares transmitted local zone information with the list of stored subscriber zone profile information, and displays a corresponding greeting when a match is found. By storing the associated greeting in the mobile terminal, the signaling of greeting information over the air interface is avoided.

The system described in the '598 patent, and a similar system described in U.S. Pat. No. 5,812,950, are systems in which the "zones" are predefined by the system and are generally dependent upon the base station locations within the system.

An additional problem is that of sending location data (e.g., global coordinates) to a third party, because a third party may be untrustworthy.

It would be desirable to be able to provide a method and system in which the physical location of a mobile terminal can be used to provide specialized, area-specific information to the mobile terminal user. It would also be desirable if the area-specific information is provided independently of the geographic structure of the mobile communication system in which the mobile terminal is operating. It would further be desirable to offer customizable services based on information in addition to the physical location information. It would still further be desirable if the area-specific information can include Internet-based information, such as a web page.

SUMMARY OF THE INVENTION

The present invention overcomes the above identified deficiencies of known systems and methods, and achieves additional advantages by providing for a method and system in which the location of a mobile terminal is used by a data server external to the mobile communication system to provide location-specific information to the mobile terminal.

In one aspect of the present invention a technique for connecting a mobile terminal to a specific data object, hereafter referred to as a "phonepage," is provided. The phonepage resides in a memory in a telecommunications network, or in a memory in a data-communications network connected thereto. The phonepage is preferably location-specific, and may be an Internet web page, but may also take other forms or appearances.

Also, dependent on the mobile terminal equipment, the phonepage may provide different levels of interaction possibilities, i.e., only display information, or be a fully interactive data object with a duplex communication between the mobile terminal operator and the node housing the memory in which the phonepage is stored.

The phonepages may be configured to be displayed automatically or by indication from the mobile terminal.

BRIEF DESCRIPTION OF THE DRAWINGS

The invention will now be more thoroughly described and features and advantages will become readily apparent by reading the following detailed description, where references will be made to the accompanying figures, where.

DETAILED DESCRIPTION OF THE INVENTION

The present invention will now be described with reference to a telecommunications system based on GSM as a circuit switched communication system and GPRS as a packet switched communications system. It should however be noted that the embodiments described are to be considered exemplary and that other packet and circuit switched systems may equally well be considered, both fixed—as well as mobile—and with any access technology, e.g., Time Division Multiple Access (TDMA), Code Division Multiple Access (CDMA), Frequency Division Multiple Access (FDMA), Orthogonal Frequency Division Multiple Access (OFDMA), Time Division Duplex (TDD), Frequency Division Duplex (FDD) or any combinations thereof. The invention is not restricted to any specific type of communications network or access technology.

Figure 1:
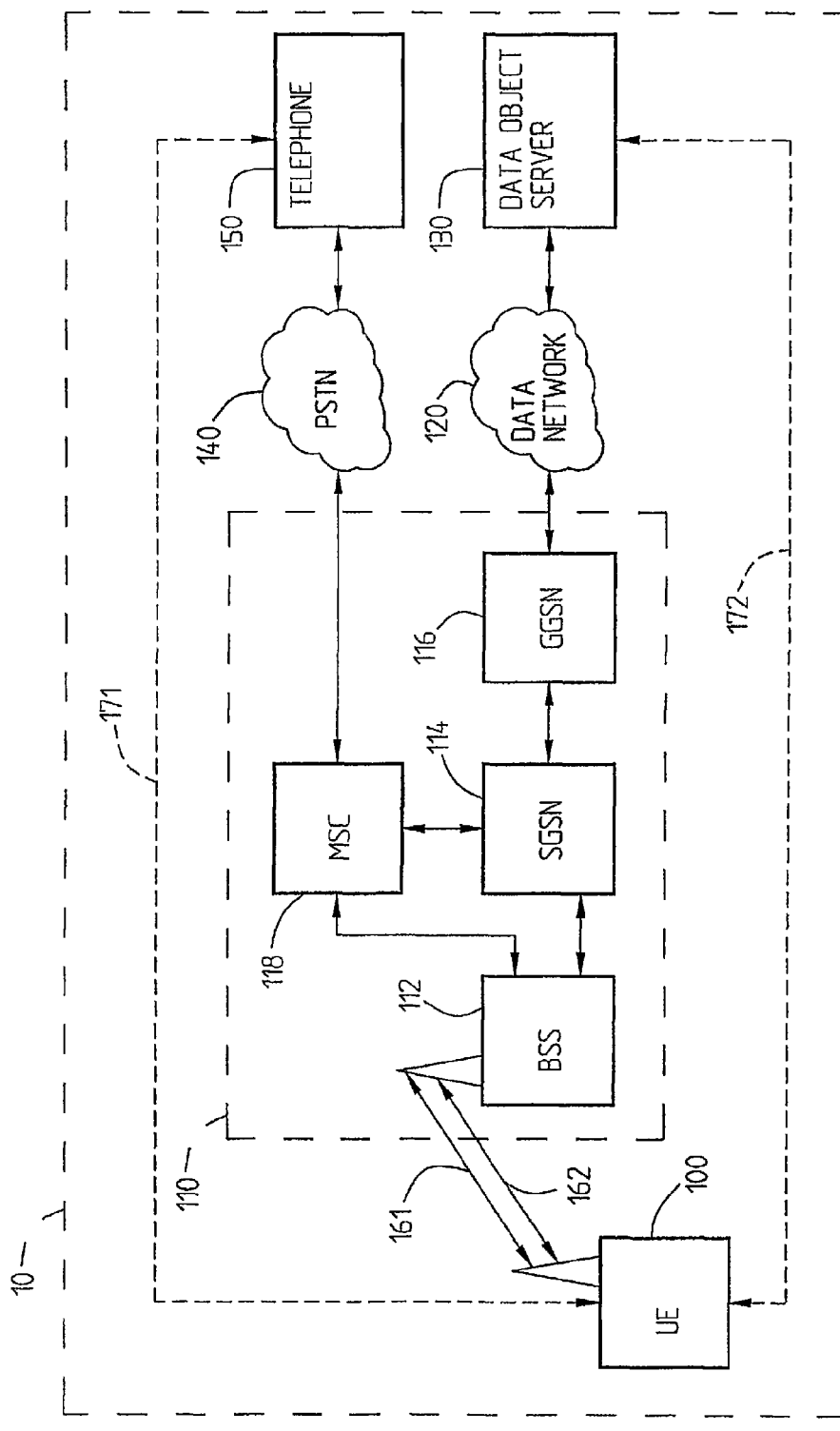
FIG. 1 illustrates an overview of a communication infrastructure overview according to one embodiment of the invention.

FIG. 1 illustrates a communication infrastructure overview, 10, where a number of different communication networks are interconnected. FIG. 1 includes both nodes included in a Circuit Switched (CS) mobile communication network, e.g., a Mobile Switching Center (MSC), 118, and Base Station Subsystem (DSS), 112, as well as nodes included in a Packet Switched (PS) mobile communication network, e.g., Serving GPRS Support Node (SGSN), 114 and a Gateway GPRS Support Node (GGSN), 116. Typically, the SGSN includes functionality such as re-segmenting data packets according to one protocol into data packets according to protocols used over the air interface. The SGSN also includes control mechanisms for one or several DSS, 112 as well as Quality of Service (QoS) mechanisms. The GGSN include functionality required to maintain communication between a mobile packet data network and other packet data networks e.g., data network 120. The CS part of the network connects to a PSTN network, 140, and the PS part of the network connects to a data network, 120. The data network may be both an external or internal network, i.e., with global or limited access possibilities. As shown, the PS and CS parts of the network may also be interconnected by way of an interface between the MSC, 118 and the SGSN, 114.

The BSS, 112, may serve both the PS as well as the CS part of the network with packet-switched (161) as well as circuit-switched (162) communication resources over the air, to provide mobility to both PS and CS service users and their User Equipment (UE), 100. The UE, 100, may for example be a mobile telephone or a mobile telephone connected to any kind of data equipment, e.g., Personal Digital Assistance Devices (PDA) or Laptop computer. The PSTN, 140, provides users (user devices) connected to the fixed network with service, e.g., to "plain old telephones" (POTs), facsimile- or data modem devices, 150. Other examples of devices connected directly or indirectly to the PSTN, 140, are ISDN terminals and communication devices connected via a Digital Subscriber line (DSL), e.g. ADSL, HDSL and XDSL.

The data network, 120, typically includes one or several routers (not illustrated) and data bridges such that several nodes may be interconnected and communicate with each other. The data network used in connection to the present invention includes also a data object server, 130. Typically, pluralities of data object servers are included in a data network, although, for reasons of explanation and clarity, only one data object server, 130, is illustrated in FIG. 1. Examples of data networks are Internet and Intranet networks. The UE, 100, may obtain a complete logical connection 171 to an indicated B-party telephone, 150, connected to the PSTN, 140, through the CS communication channel, 162, provided between the UE, 100, and the BSS, 112, and further via the MSC node, 118, over which conversation may be conducted between either party UE 100 and telephone 150. Similarly, the UE, 100, may obtain a complete logical connection 172 to equipment, e.g., data object server, 130, connected to the data network, 120, through the PS communication channel, 161, provided between the UE, 100 and the BSS, 112, and further via the SGSN, 114 and GGSN, 116, node, over which data may be sent between either party UE 100 and data object server 130.

According to one aspect of the present invention a data object server, 130, includes graphical information objects, i.e., phonepages, associated to a telephone number and/or to a physical location. The telephone number is identical to a subscriber number, i.e., an A- or B number, addressing originating user equipment or terminating user equipment, respectively. The A-party, upon a suitable triggering event, connects to a data object server, 130, by way of PS communication channel and receives a data object, i.e., a "phonepage" stored in a memory position in the data object server. The phonepage may consist of location-specific information, such as vehicle traffic information, news advertisements, etc., or it may simply provide an immediate access to an internal or external data network. After having received the phonepage, one or several procedures may follow.

Figure 2:
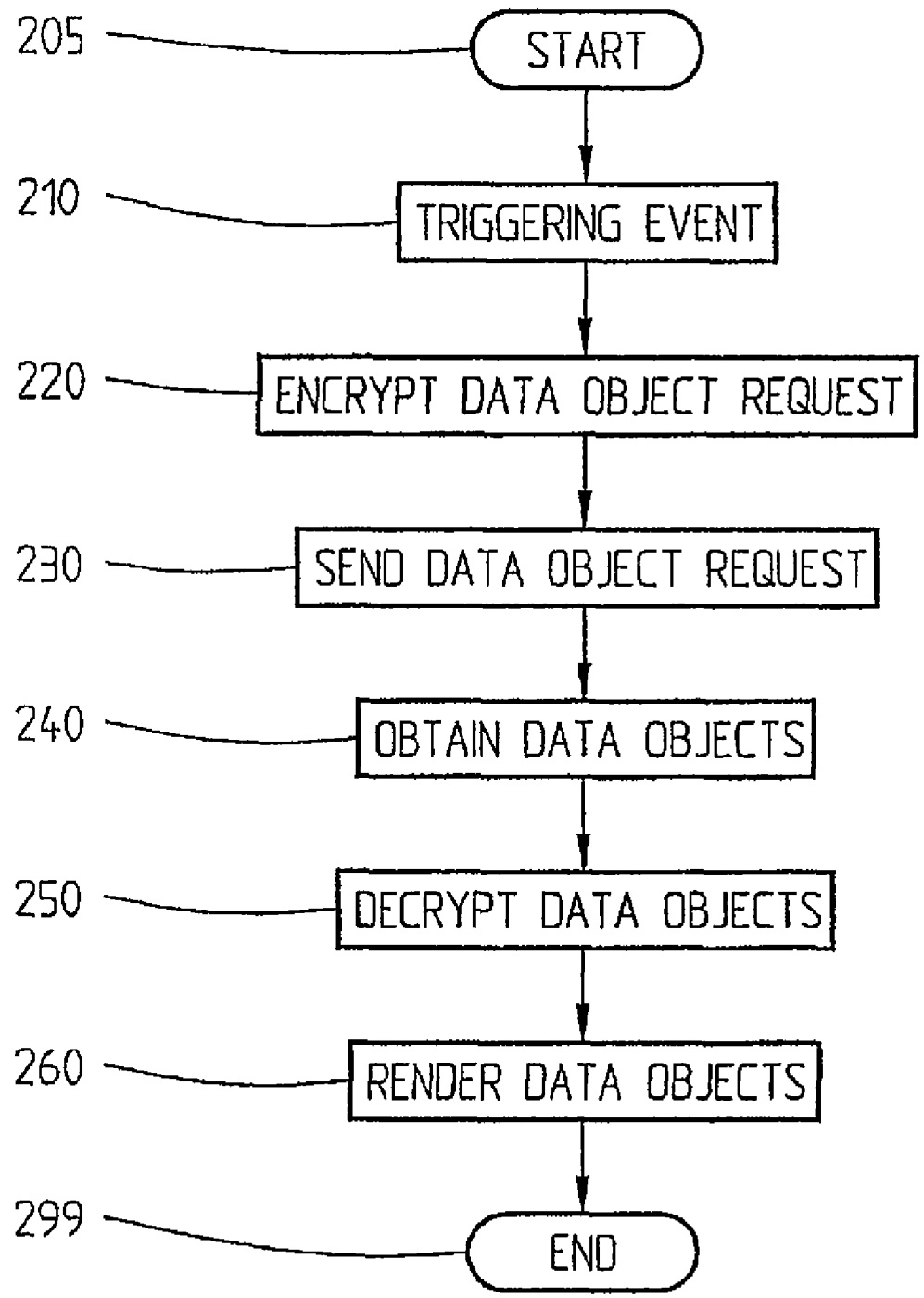
FIG. 2 illustrates a first flow diagram of a subscriber interaction in an A-party UE according to one embodiment of the present invention.

FIG. 2 illustrates a flow diagram of a procedure in a UE (like the UE, 100) for receiving a phonepage in the UE, according to one embodiment of the present invention. In step 205, the procedure starts by an initiation from the A-party, (e.g. a UE is switched on). In step 210, a trigger of a phonepage request is indicated, either automatically (e.g. a call is terminated by the other party) or manually by the A-party (e.g., the dialing of a B-number). The triggering event, 210, may be at least one of a number of events, e.g.:

an outgoing call is or is about to be initiated;
an addressed B-party answers a call;
an addressed B-party is busy;
an addressed B-party does not answer;
an addressed B-party rejects a call;
an addressed B-party is unavailable (e.g. an addressed mobile phone is out of coverage);
an incoming call is imminent or has just started;
a conference call is or is about to be initiated;
a call is disconnected;
a call is conducted (under which several triggering events can be generated);
a subscriber is put on hold;
a new cell in the PLMN has been selected;
the location of a subscriber has changed;
a new Public Land Mobile Network (PLMN) operator is selected;
a new country of registration is made;
a UE is about to be switched off;
a UE has been switched on;
a designated button on a UE is pressed;
in response to a talk spurt received by a UE;
a voice mail has been left to a subscriber;
an SMS has been sent to a subscriber.

The A-party initiates a request in step 230, possibly after encryption in step 220, and sends this request via a communication channel, (e.g., packet switched as illustrated in FIG. 1) to a data object server. The data object request in this embodiment includes the physical location of the UE (which can be in the form of, e.g., a code containing GPS coordinates a postal code, or some other suitable code generated automatically by the UE or manually by the A-party user) and may also include any one or more of a number of different parameters, e.g.:

a requested protocol to be used for transmission (e.g., WAP, WML, HDML, HTML);
an identification of a data object server (e.g. a server name or a plain IP address);
a code denoting what kind of event that triggered the data object request (e.g. outgoing call setup);
the indicated B-number associated with at least one B-party equipment;
an A-party identity, e.g., an A-number of a mobile station;
a network address of the A-party (e.g. IP address) used by the data object server when returning a requested data object;
a capability code indicating the displaying capabilities of the A-party (e.g. screen resolution, audio etc.);
a code indicating an encryption scheme or encryption key used;
a code indicating in what country the mobile station is registered (country code);
a code identifying the current PLMN(V-PLMN) operator or the PLMN where the A-party has a subscription (H-PLMN) or both;
a code indicating the vendor of the mobile station and the type of the mobile station;
a code indicating an equipment unique identity;
a validation code (e.g. a checksum) of the parameters.

The data object request in 230 may, according to a variant of the invention, be answered by the data object server in an encrypted format, in which case a decryption in step 250 follows the reception of the response in the user equipment.

In the next step follows a rendering procedure in step 260, where the data objects are received and displayed according to the capability of the UE after which the procedure is ended in step 299. Typically after step 299, there will follow one or several procedures according to the capability of the A-party UE or the type of equipment addressed by a B-number. For example, a call may be setup or a call may be disconnected. According to one of the above mentioned embodiments, where a continuous triggering event is that the UE has changed locations from a first defined area to a second defined area, special advantages may be relevant (e.g. commercial information may be provided).

Figure 3:
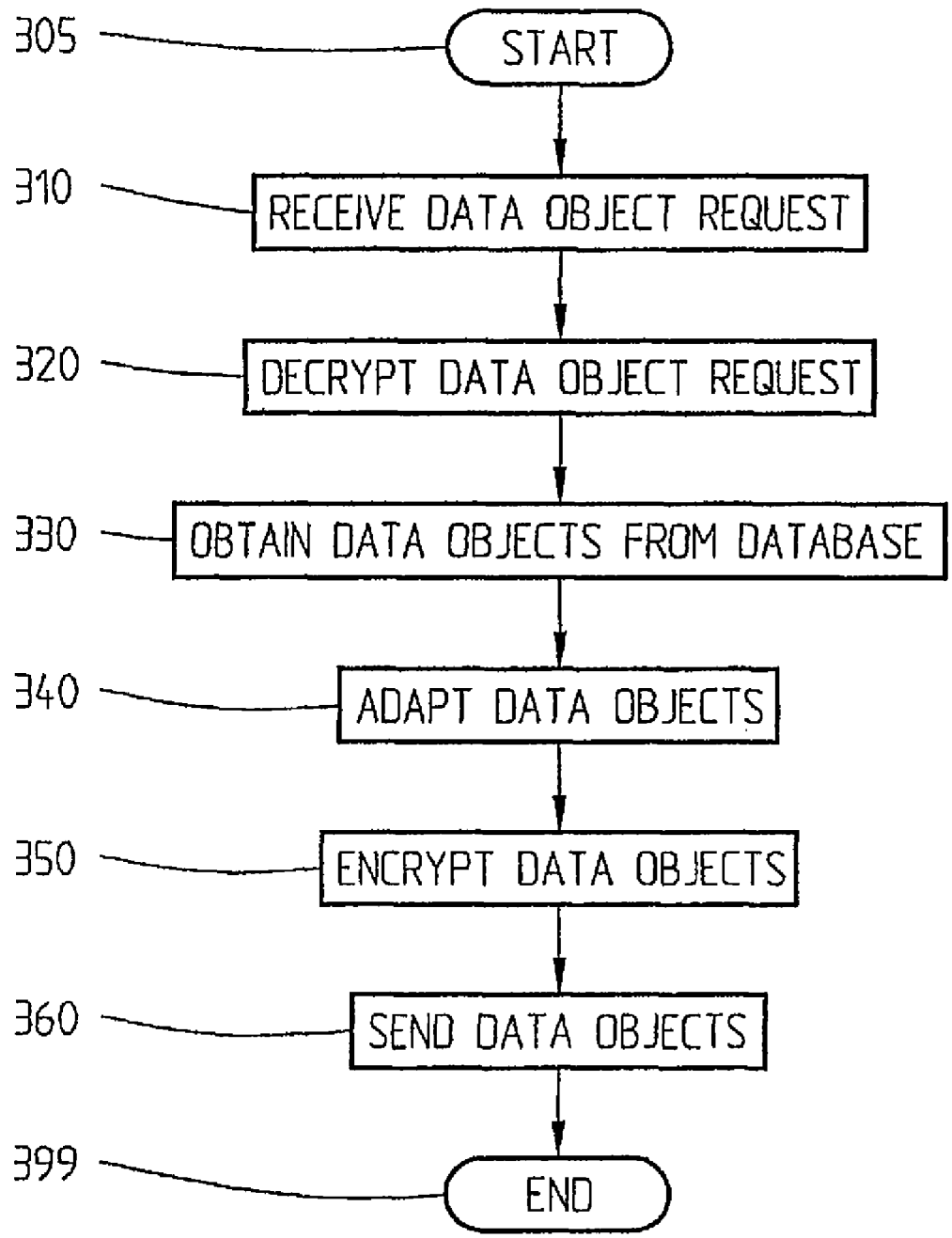
FIG. 3 illustrates a first flow diagram of a subscriber interaction in a data server according to one embodiment of the present invention.

FIG. 3 illustrates the corresponding procedures in a data object server (like the data object server 130), wherein, in step 305, the procedure starts and in step 310, the data object server receives a request for a data object. The request typically includes at least a location of the mobile terminal, and may further include other information such as an identification corresponding to the mobile terminal, and what kind of action triggered the request. If the request is encrypted, decryption will be made in step 320, before interpreting the content. The location indication in the request received in step 310 will be mapped with a memory address in the data object server, or to an address in a connected memory and the data object, i.e., phonepage will be retrieved in step 330. The request in step 310 may also include an indication of a UE display capability, in which case the data object may be adapted in the data object server to a specific rendering capability, step 340, of a receiving UE. If the request was encrypted, or if requested for some other reason, the data object will be encrypted in step 350 before it is returned to the requesting UE, in step 360 and then the procedure is ended in the data object server in step 699.

The retrieved phonepage can be provided to the requesting UE along with an area descriptor which corresponds with or defines a specific geographic area in which the UE is located. The area descriptor may be provided by the server to the UE using cookies or other appropriate techniques.

The above described general solution to obtain a data object connected to a location indication may of course be varied in a number of different ways, depending on, e.g., the capabilities of communication of the UEs involved. For example, a method of simultaneously requesting, encrypting, obtaining, decrypting and rendering a sequence of data objects can also be applied in a variant of the present invention.

User equipment such as mobile stations are today developed to handle both packet switched and circuit switched communication simultaneously. These are generally referred to as class A mobile stations. Other mobile station design allows packet switched and circuit switched communication alternatively, i.e., no simultaneous PS and CS transmission and reception. These are generally referred to as class B mobile stations.

Figure 4:
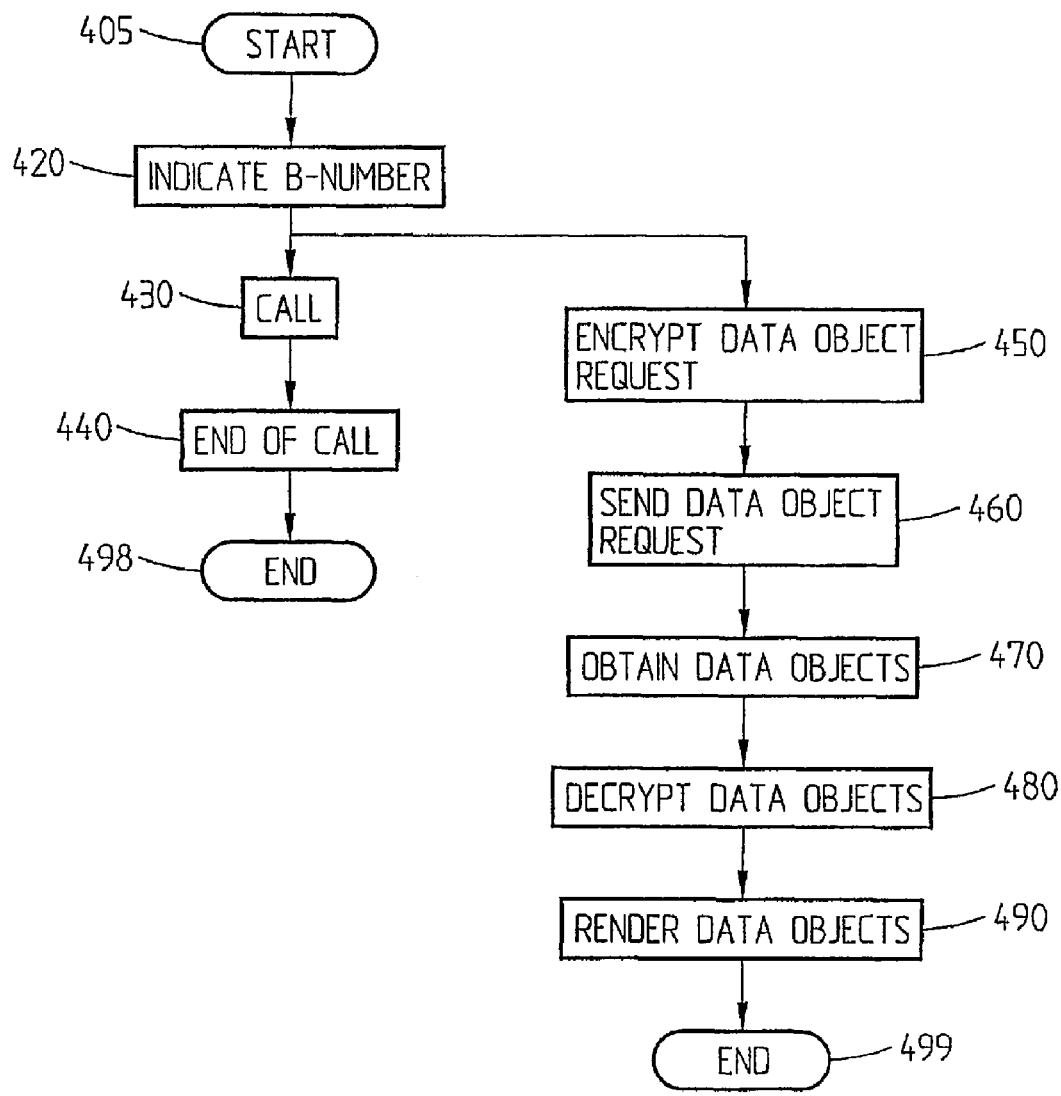
FIG. 4 illustrates a second flow diagram of a subscriber interaction in an A-party UE according to an embodiment of the present invention, when data and voice communications can be conducted simultaneously.

In FIG. 4 is illustrated a flow diagram of procedures included when a circuit switched connection is initiated from a UE which is a class A mobile station according to one aspect of the present invention. In step 405, the procedure is started when a class A mobile station is not involved in a call session and when a triggering event occurs, e.g., a user starts to indicate a B-number to a B-party, step 420, by pressing a digit, a button or by activating voice recognition means. During step 420 the entire B-number is obtained. The mobile station now start to set up two different connections, a circuit switched connection for a voice communication channel in step 430-440-498, and a packet switched communication channel for retrieval of a location-specific phonepage in step 450-499. These procedures may in a class A mobile station be simultaneous.

For the circuit switched procedures, a voice connection with a B-party is initiated in step 430, a communication recourse is assigned by a mobile network over which a telephone conversation may take place. The telephone conversation is ended in step 440 as any ordinary voice call, for example by pressing a designated button on the mobile station or hanging up a handheld part of a fixed network telephone. Ending the call also involves de-allocation of relevant communication resources within the circuit switched part of the mobile communication network as well as e.g., any PSTN resources involved in the connection.

The packet switched procedures basically follow the procedures described in connection to FIG. 3, where a data object request is sent, possibly after encryption, steps 450 and 460 and a response is received and the location-specific phonepage displayed, possibly after proper decryption thereof, steps 470-490, after which the packet switched connection also ends, in step 499.

As mentioned above, a class B type mobile station cannot handle two simultaneous connections, one packet and one circuit switched, so another approach to retrieve a phonepage is then necessary when setting up a circuit switched voice connection.

Figure 5:
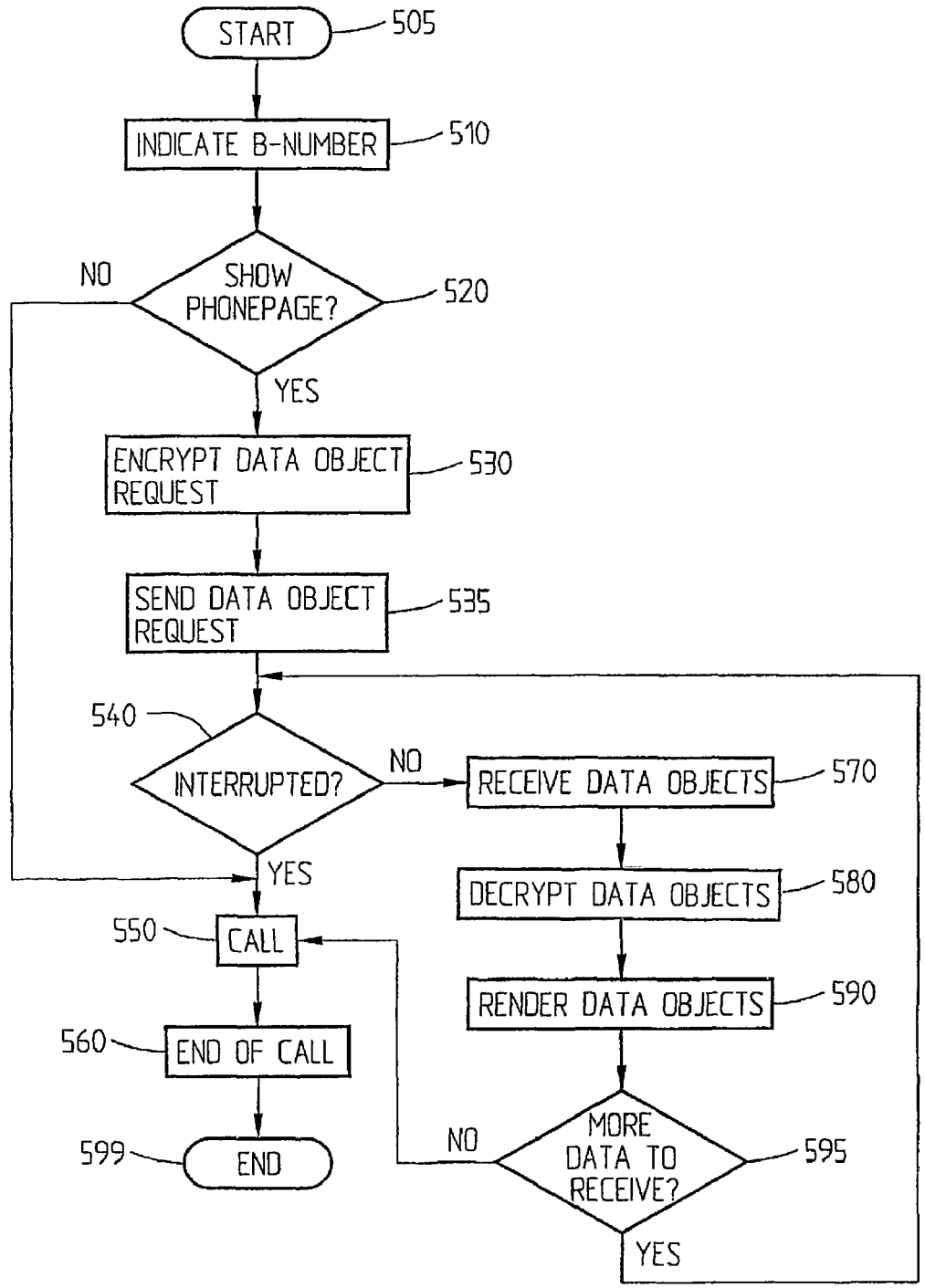
FIG. 5 illustrates a third flow diagram of a subscriber interaction in an A-party UE according to another embodiment of the present invention, when data and voice communications can not be conducted simultaneously.

FIG. 5 illustrates a similar procedure to that explained with reference to FIG. 4, but with a mobile station of a class B type used in the A-party, call originating end.

In step 505 the procedure starts and in step 510, the B-number (or other triggering event) is indicated as described above in reference to FIG. 4. In this embodiment, a step 520 is introduced where it is possible to select if a phonepage is to be requested or not. This can typically be a selection made by the user. According to one embodiment of the current invention double clicking on a designated SEND button indicates that the phonepage is to be requested. If it is indicated that a phonepage is not desired, then follows in step 550-560 and 599 a circuit switched call connection and termination as explained in relation to FIG. 4, steps 430,440 and 498.

If it is indicated that a phonepage is desired, then the following steps are to encrypt, 530, and send, 535, a data object request on a packet switched communication channel. As long as the packet session is not interrupted, 540, the download of data object continues to the A-party. Data objects are received in step 570, decrypted, if encrypted, in step 580, and rendered in step 590. In step 595 the data objects are detected and as long as there is more information to receive, step 595, and there is no interruptions in step 540, the data download continues. A possible interrupt may occur, e.g., when a user wishes to no longer wait for a complete download of a phonepage and instead initiates the circuit switched communication in step 550. This may be initiated by a time expiring or by manually indicating on a man-machine interface (MMI). At the latest, the circuit switched communication is initiated when there is no more phonepage data to download. According to another embodiment of the present invention the phonepages for a class B UE are obtained from the data object server, 130, upon call completion or whenever the UE is not involved in a call, and are stored locally in the UE being readily available upon a next triggering event.

Figure 6:
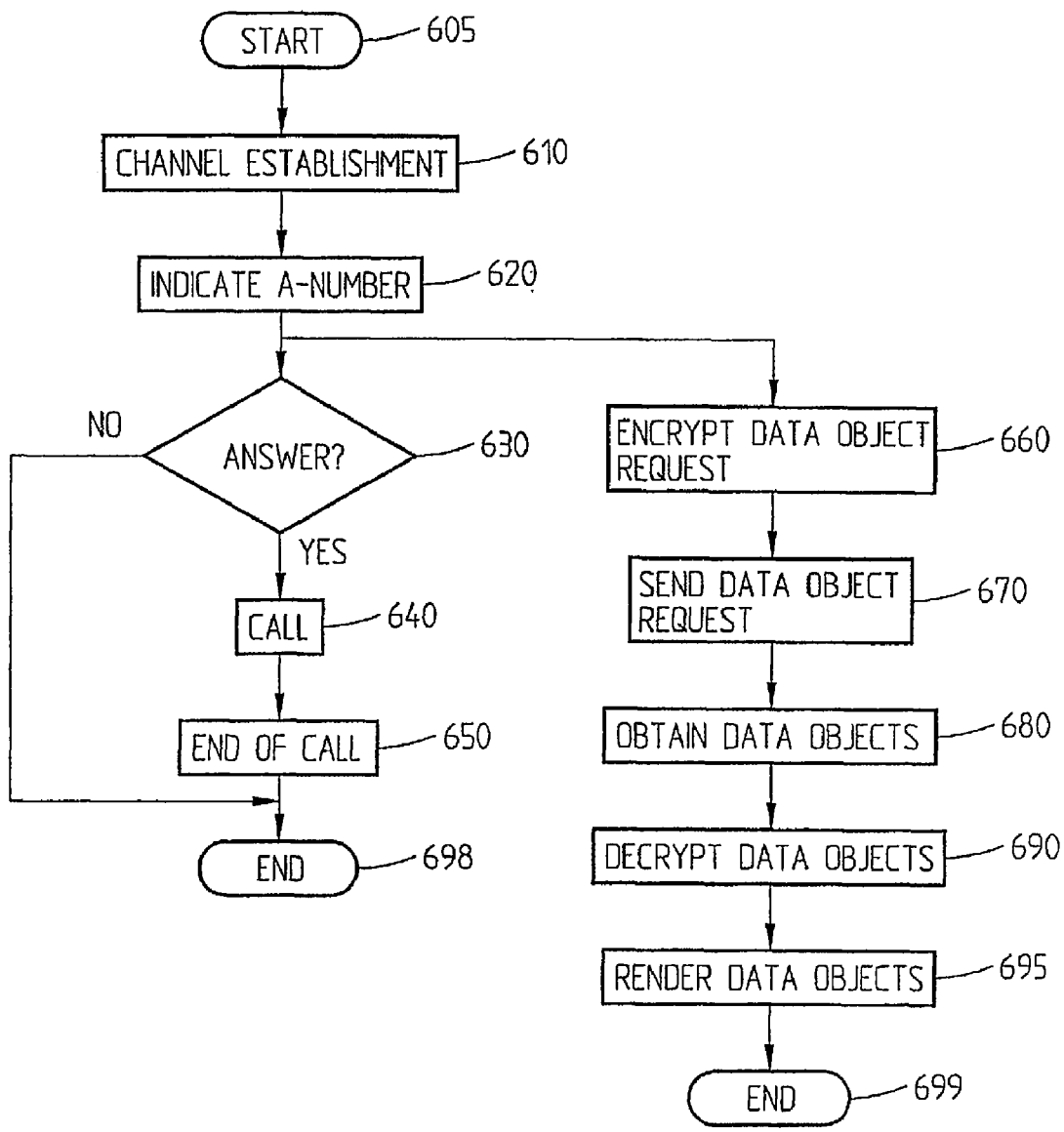
FIG. 6 illustrates a flow diagram of a subscriber interaction in a B-party UE according to an embodiment of the present invention.

So far, the retrieval of phonepages to display in an A-party equipment has been addressed. It should be recognized that a B-party may similarly also display a phonepage related to a connection, preferably a phonepage identified with the A-party location. In FIG. 6 is illustrated a flow diagram of the procedures in a B-party user equipment for retrieval of A-party phonepages according to one embodiment of the present invention when the B-party has the capabilities corresponding to that of a class A mobile station. The procedure starts in step 605, e.g., by an incoming call to a B party UE. In step 610 a communication channel is allocated between the UE and the network, 110, it is connected to. In step 620 an indication of the call originating identity, i.e., the A-party identity, preferably, an A number, is revealed to the B-party.

Then in step 660 and 670, a request is sent, subsequent to encryption thereof, to a data object server. The request is, when received in the server, treated similarly to the requests received from the A party, i.e., decrypted if necessary, and responded to in transmission of a data object related to the A-party identity. The UE receives the data objects, i.e., phonepage in step 680 and after decryption in step 690, if necessary, the phonepage can be displayed to the B-party user in step 695.

If the call is answered in 630, the voice connection may follow the same procedures as those described in relation to FIGS. 3 and 4. If the call is not answered the voice part sequence ends in 698.

For reasons of clarification, several steps in the signaling between the UE 100 and the communication infrastructure 110; between the UE 100 and the data object server 130; have been omitted, in several embodiments above, and focus has been put on the necessary and novel steps according to the invention, in the aforementioned signaling.

It should be understood that other procedures (e.g. authentication, channel assignment and charging) might occur in addition to what has been described in the aforementioned signaling.

Figure 7:
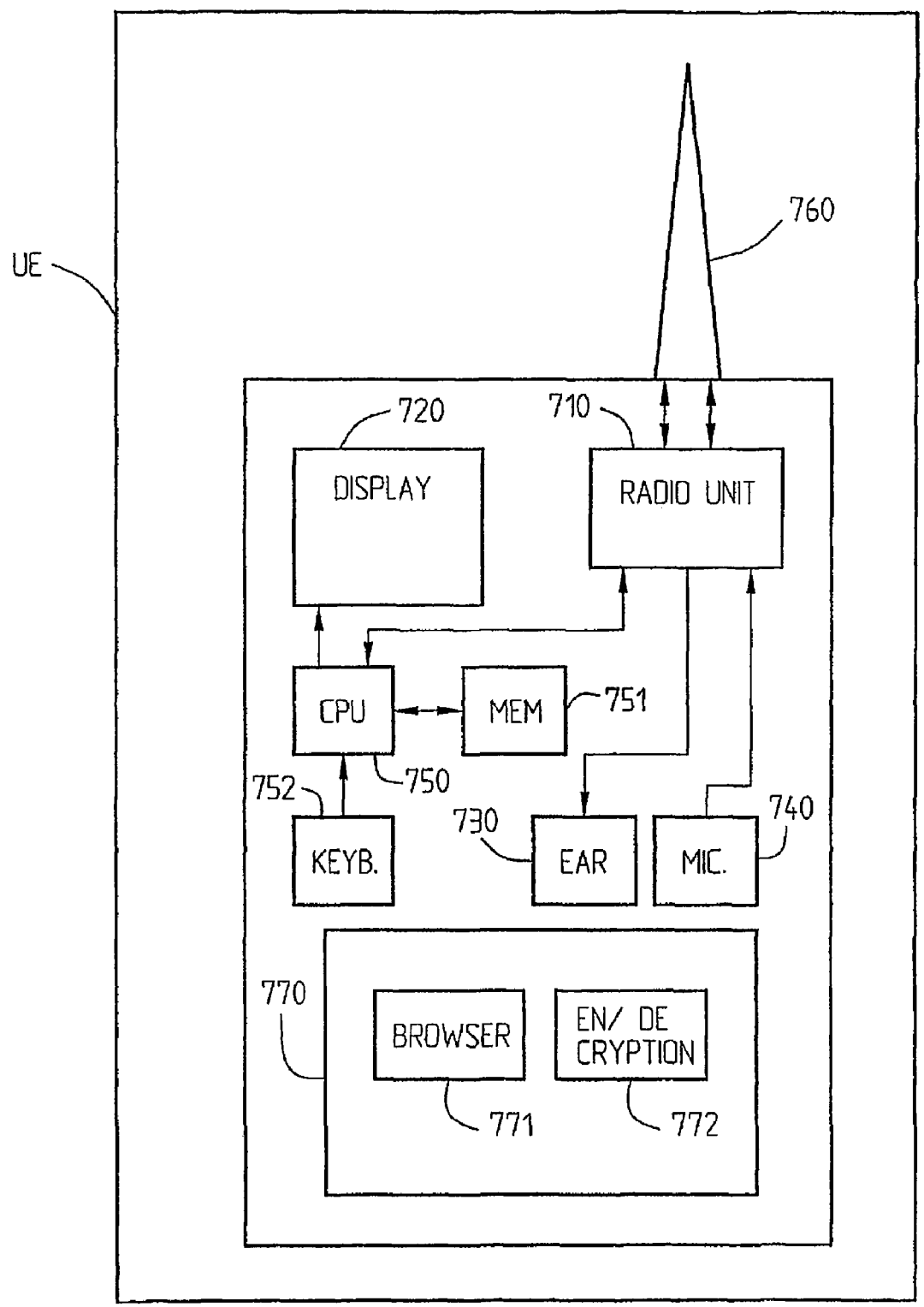
FIG. 7 illustrates an exemplary block diagram of a UE according to one embodiment of the invention.

FIG. 7 illustrates a UE according to be used in one embodiment of the present invention, where the UE is a mobile telephone or a PDA with mobile telephone capabilities. A Central Processing Unit (hereafter CPU) 750 is connected to at least one memory unit 751, and at least one display 720. The CPU 750 may also be connected to a keyboard device or area 752 to allow subscribers to enter for example digits. The memory unit 751 may be non-volatile (e.g. EEPROM or SIM card) in order to retain stored information, should power be temporarily unavailable. The CPU 750 is further connected to a radio unit 710 that may convert incoming and out going data to RF modulated signals. The radio unit 710 also connects to an antenna 760 allowing the RF modulated signals to be received/transmitted to an RF compatible media (e.g. air). The radio unit 710 may also directly or indirectly be connected to an earphone 730 and a microphone 740 in order to allow voice communication. The UE may further comprise a plurality of programs 770, e.g., a browser, 771, that can render at least one type of data object, and an encryption/decryption engine 772 allowing data object requests to be encrypted and data objects to be decrypted. The UE may optionally be equipped with a cache memory in which it is possible to store and retrieve data objects without occupying transmission resources within the communication network 10.

Figure 8:
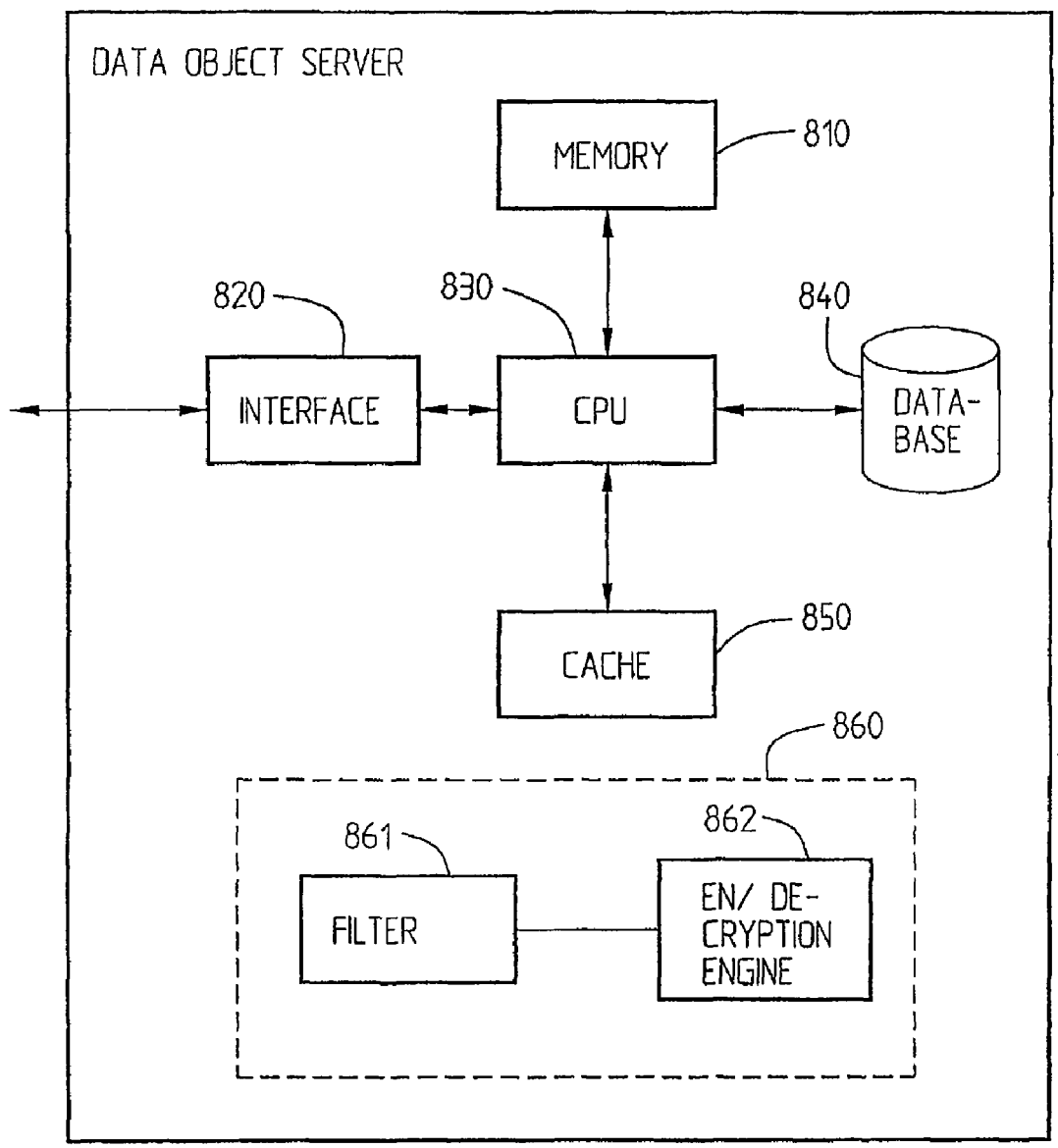
FIG. 8 illustrates a block diagram of a data object server in a data network according to one embodiment of the invention.

FIG. 8 illustrates a data object server 130, according to one embodiment of the present invention. The data object server comprises at least one CPU 830 connected to at least one memory device 810, a cache memory 850, at least one database 840 and at least one interface 820. Memory devices 810 and databases 840 may be nonvolatile.

The interface 820 enables the CPU 830 to send and receive data to/from the data network 120. The cache memory 850 allows storage of frequently used data objects so that the CPU 830 may obtain them readily. The database 840 contains the actual data objects that can be requested by the UE 100 via a communication infrastructure 110 and a data network 120. The data object server may also further comprise a number of programs 860 including, but not limited to, a filter 861 allowing the data objects to be optimized according to the rendering capabilities of the UE 100; and an encryption/decryption engine 862 allowing data object requests to be decrypted and data objects to be encrypted.

According to a variant of the invention the blocks 810, 820, 830, 840, 850 and 860 may be implemented on a plurality of computers. According to another variant of the present invention, the said plurality of computers may be located at a substantial distance.

B-number indication involves any means of indicating a B-number in an A-party UE.

Figure 9:
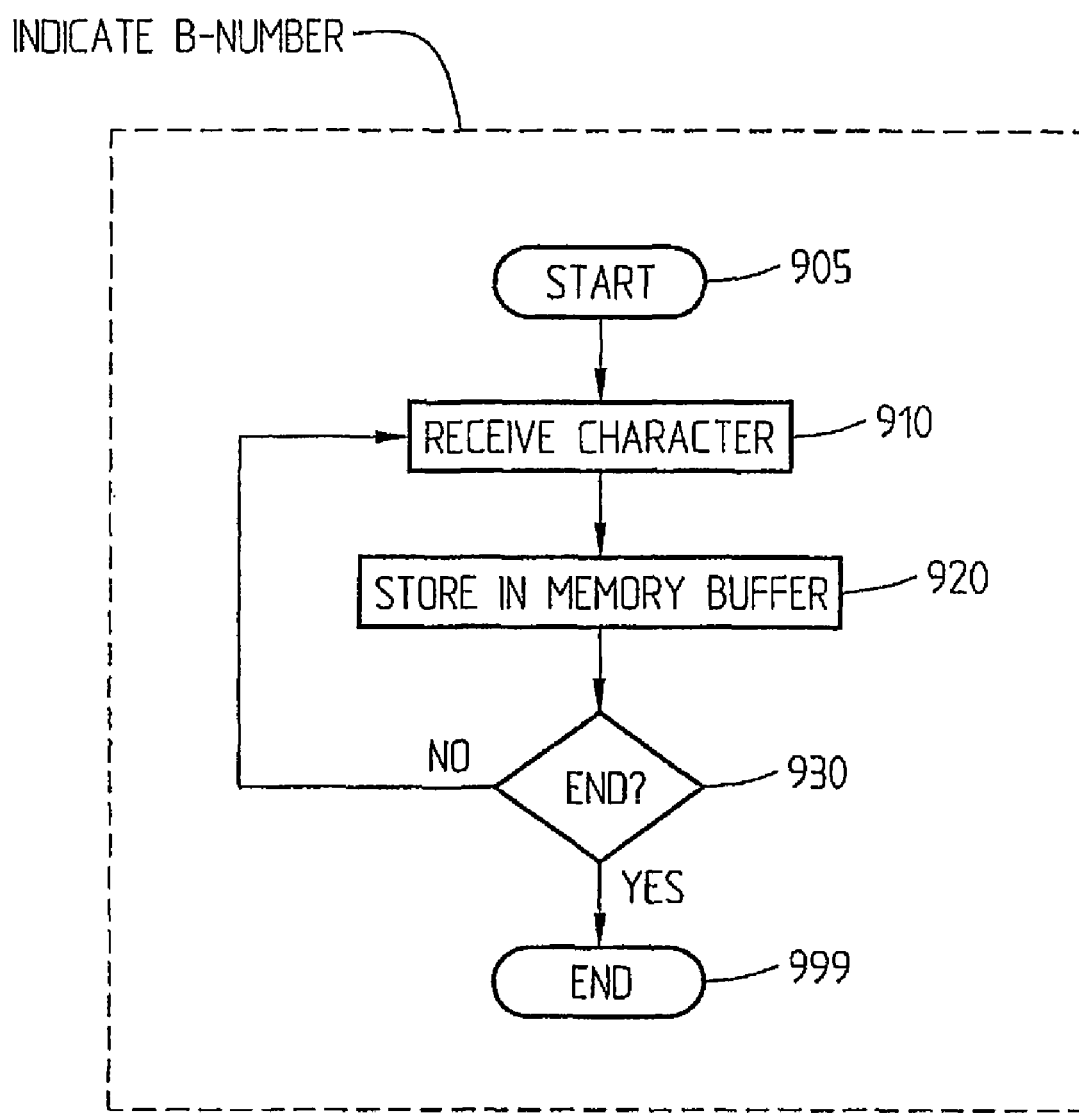
FIG. 9 illustrates a flow diagram of B-number indication procedure according to one embodiment of the present invention.

A first example of B-number indication procedure is described with reference to FIG. 9 where the B-number indication comprises a start step at 905 and the step 910 of receiving a character from a keyboard arrangement. In response to step 910, storing the character in a memory buffer in the UE in step 920 and checking if the B-number is complete in step 930. If the number is incomplete step 910, 920 and 930 is repeated.

If the B-number is complete the B-number indication procedure is concluded in 999.

Determination of B-number completion 930 may or may not involve the use of timers supervising the indication procedure; a short key combination in order to minimize the number of keys pressed; designated buttons to indicate number completion (e.g. pressing SEND or CALL buttons once) or by analyzing the digits in the memory buffer for B-number completeness.

A second example of B-number indication is by means of voice detection, whereby an incoming talk spurt is successfully matched with an entry in an internal database contained in a UE 100, whereby a valid B-number could be obtained in response to the aforementioned talk spurt.

A-number indication involves any means of indicating an A-number to a UE 100.

Figure 10:
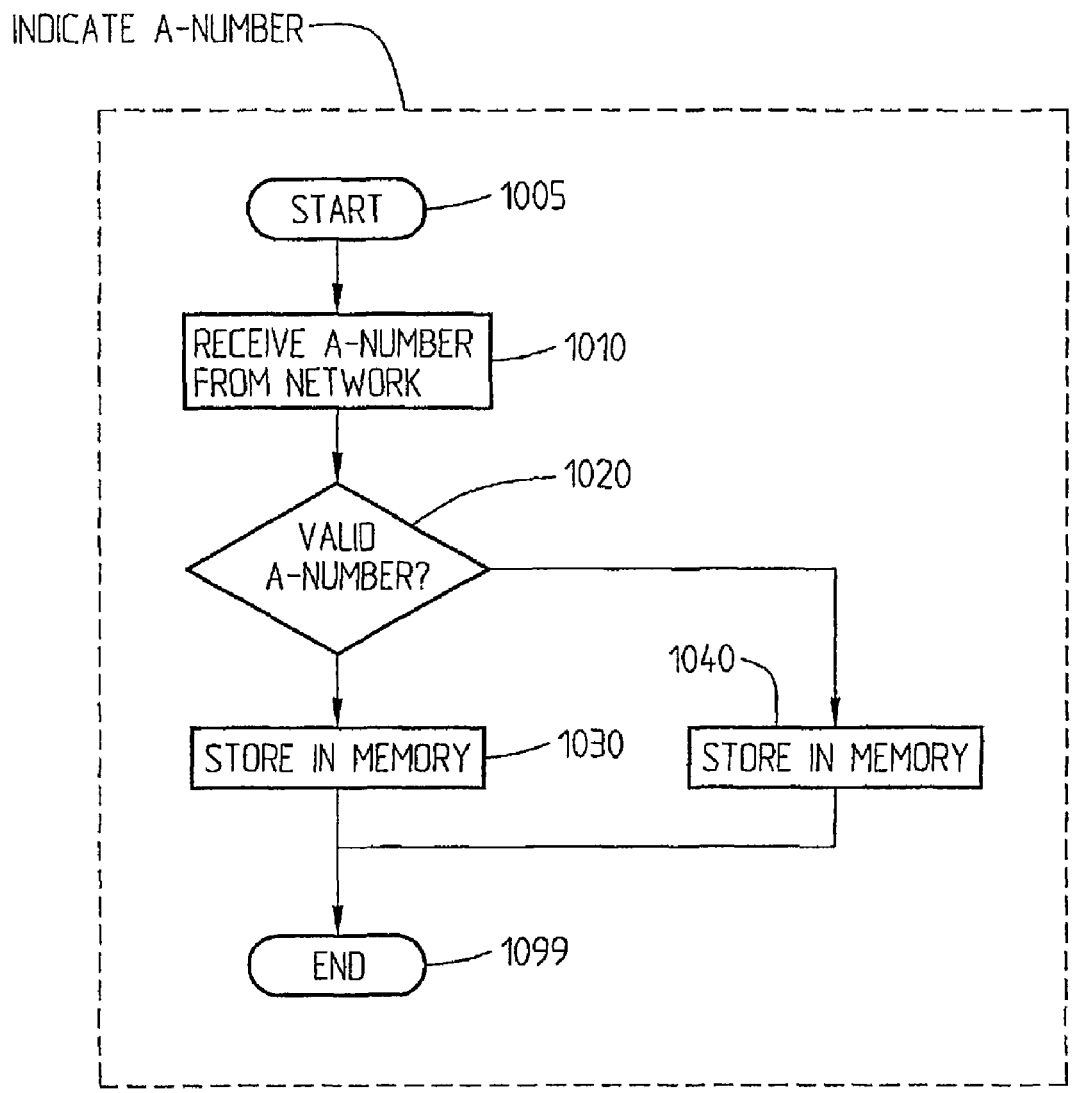
FIG. 10 illustrates a flow diagram of A-number indication procedure according to one embodiment of the present invention.

A first example of A-number indication procedure is described with reference to FIG. 10 where the A-number indication comprises the step 1005 of starting the procedure and 1010 of receiving an A-number from a communication infrastructure 110. In response to step 1010 checking if the A-number was valid (e.g. not blocked, secret or misinterpreted) and if it was valid, storing the A-number in a memory in the UE 100 in step 1030. If the A-number was not valid, a flag indicating an invalid A-number is stored in a memory of UE 100. The procedure is ended in 1099.

A second example of A-number indication is by means of sending an A-number or data objects in response to an A-number directly on a logical data communication link 161.

Figure 11:
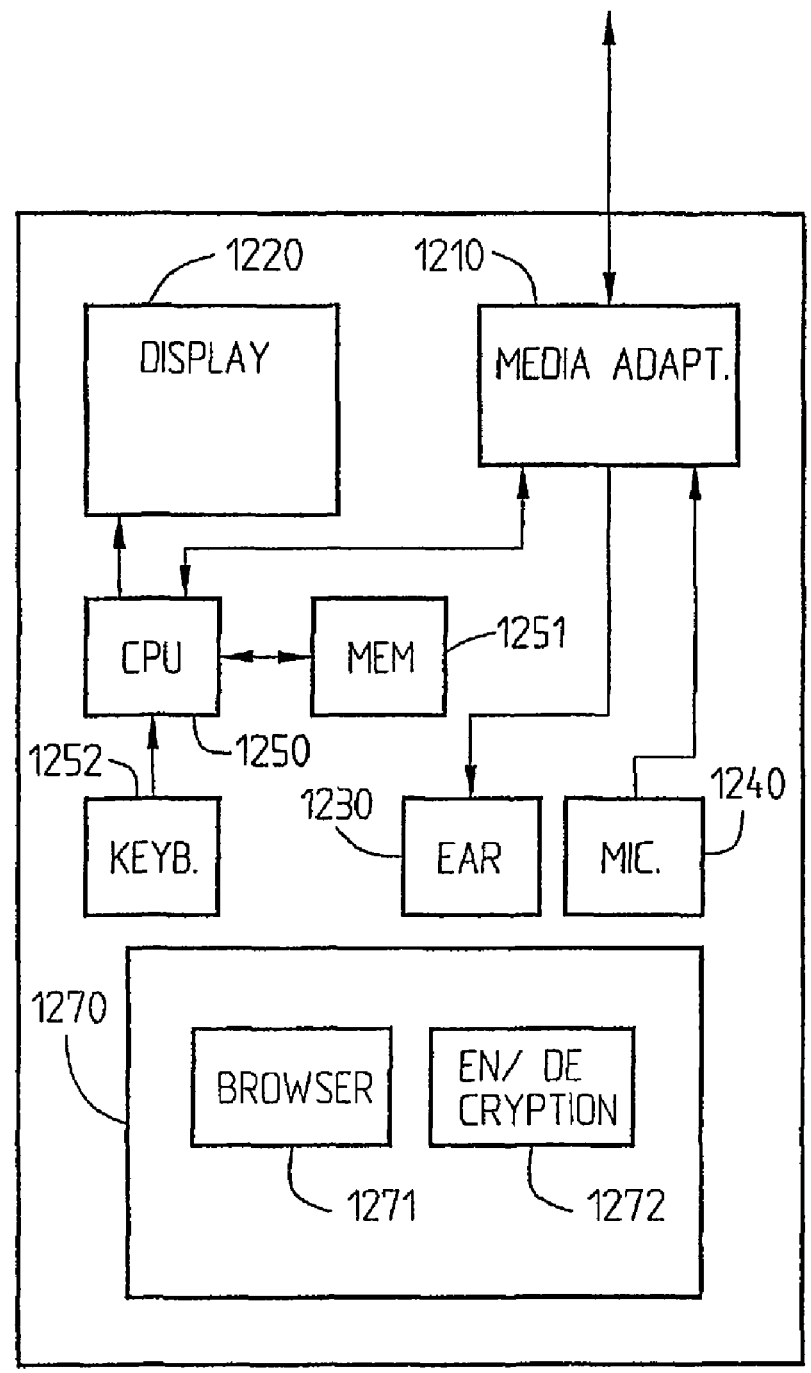
FIG. 11 illustrates an exemplary block diagram of a UE where the UE is connected to a fixed network according to one embodiment of the invention.

FIG. 11 illustrates a UE 100 according to a second variant of the invention when the UE 100 is a fixed telephone with graphic capabilities. According to this second variant, the UE 100 is equal to a mobile telephone as described in FIG. 7 but with the exception that the radio unit 710 and antenna 760 are replaced with a media adapter 1210 that converts incoming and outgoing signals to and from a particular media standard including but not limited to ISDN, ADSL, HDSL, VDSL, cable networks, and any combination thereof.

Figure 12:
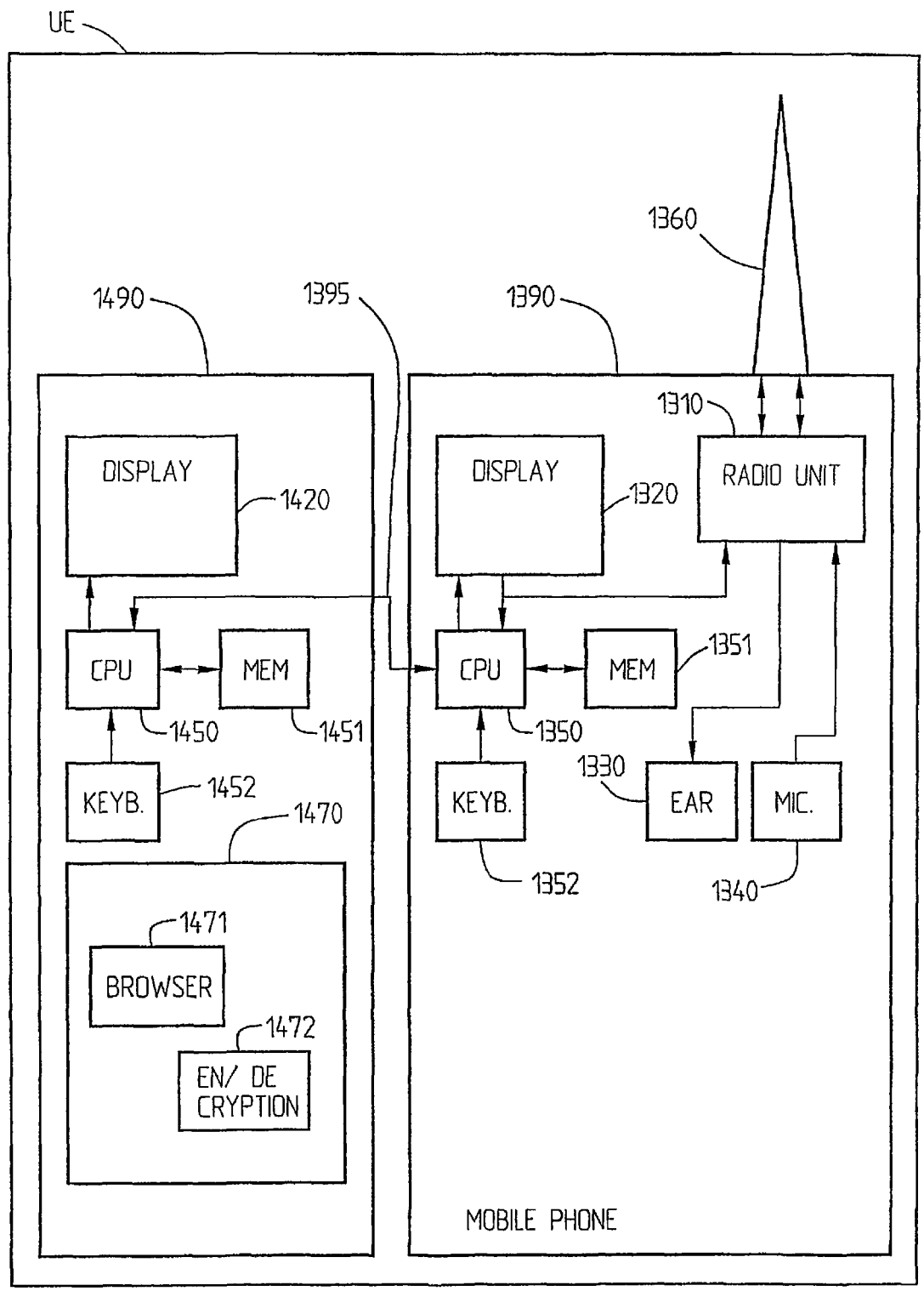
FIG. 12 illustrates an exemplary block diagram of a UE where the UE consists of a PDA and a mobile phone according to one embodiment of the invention.

FIG. 12 illustrates a UE 100 according to another embodiment of the invention when the UE 100 is a mobile telephone 1390 possibly without data object rendering capabilities, with an antenna 1360, connected to a PDA 1490 via a communication link 1395. The communication link may for example be realized with an infrared, radio (e.g. Bluetooth) or wire communication arrangement. The PDA 1490 further comprises a CPU 1450 connected to at least one memory unit 1451, and at least one display 1420. The CPU 1350 may also be connected to a keyboard device or area 1452 to allow subscribers to enter for example digits. The memory unit 1451 may be nonvolatile (e.g. EEPROM or SIM card) in order to retain stored information, should power be temporarily unavailable. The PDA 1490 further comprises a collection of programs 1470 including but not limited to a browser 1471 that can render at least one type of data object and an encryption/decryption engine 1472 allowing data object requests to be encrypted and data objects to be decrypted. The mobile phone 1390 is further described in FIG. 7 where 1320 corresponds to 720, 1310 corresponds to 710, 1350 corresponds to 750, 1351 corresponds to 751, 1352 corresponds to 752, 1330 corresponds to 730 and 1340 corresponds to 1340.

Having described the general procedure and equipment involved in implementing embodiments of the present invention, the aspect of the present invention involving location-specific data objects will now be discussed in more detail with reference to FIG. 13. It will be appreciated that by providing an area descriptor and corresponding data object to a mobile terminal upon the occurrence of a triggering event, numerous unobvious advantages can be achieved. For example, advertisements, maps, tourist information, vehicle traffic information, or other useful information can be provided to the user or subscriber associated with the mobile terminal. Further, by providing location data to the data object server, an area-specific phonepage can be provided for a specific (local) location of a business establishment (e.g., a phonepage for a local franchise of a national corporation) rather than a regional, national, or international phonepage (e.g., a "national" corporation phonepage). When the mobile terminal leaves an area (e.g., as defined by the area descriptor), substantially immediately or when the next triggering event occurs, a new area descriptor and data object can be sent to the mobile terminal. This technique effectively allows a location of a mobile terminal to be transformed to a URL, thereby allowing (among other advantages) mobile advertisements to be provided for different regions. If the data object request includes, in addition to the location of the mobile terminal, other indications such as subscriber identity, home country, it will be appreciated that even more sophisticated and better-tailored information can be provided to the mobile terminal.

Figure 13:
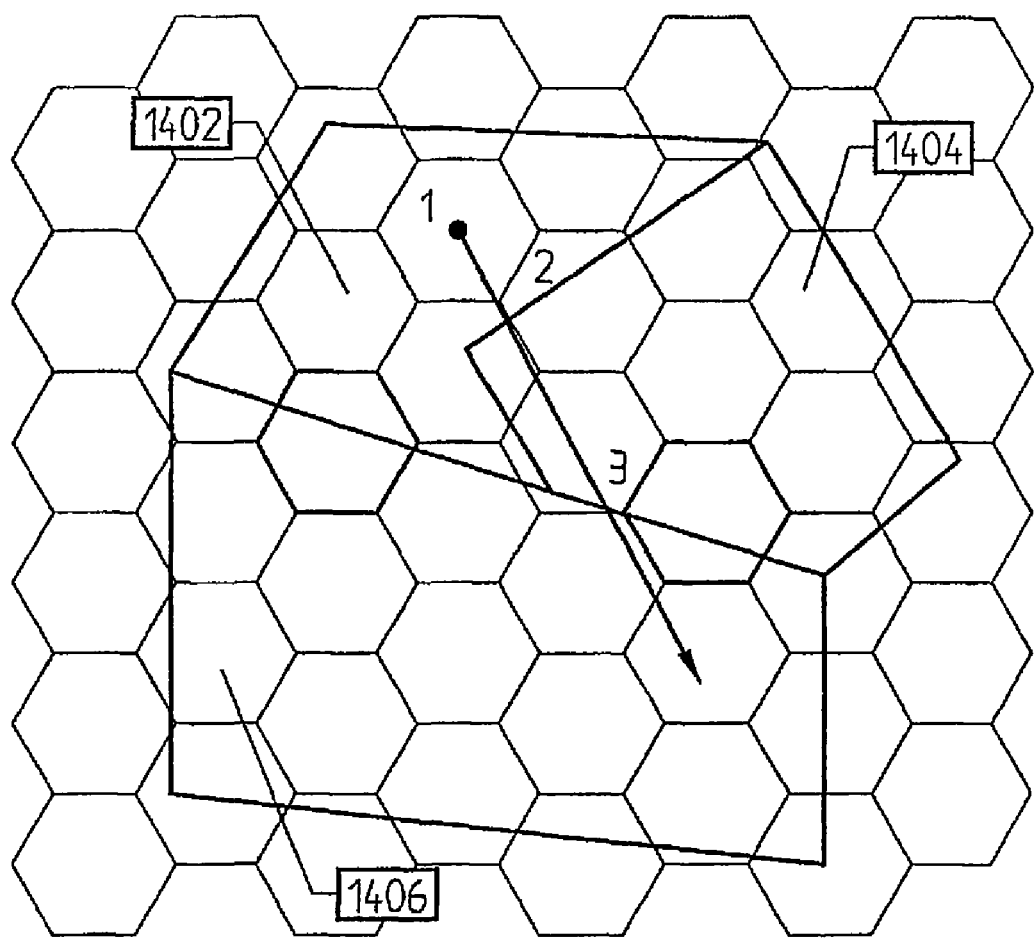
FIG. 13 illustrates an exemplary map of multiple areas in which area-specific information can be provided to a UE in accordance with an aspect of the invention.

Referring now to FIG. 13, an illustration of a mobile terminal traveling across different geographic regions is shown. The UE 100 is located in area 1402 at instance 1, and travels to area 1404 at instance 2 and to area 1406 at instance 3. In this example, the UE is switched on at instance 1, while in area 1402, and the UE scans for available service network(s). Once the UE finds the network, and the UE is accepted by the network, the UE establishes its location and transmits (directly, or upon the occurrence of an appropriate triggering event) this information to the data object server (such as data object server 130, FIG. 1). The server 130, using a method such as that described with respect to FIG. 3, transmits an area descriptor and a location-specific data object (e.g., phonepage, such as a viewable web page, a WAP page, or a redirection to another data server containing relevant information) to the UE. The area descriptor can be a definition or boundary indication of the area 1402, in which the UE is presently located at instance 1. It will be appreciated that areas 1402, 1404, and 1406 can be completely independent of, or can expressly correspond to, the structure (e.g., the "cells") of the service network. It should further be appreciated that the data server 130, particularly where the areas described by the area descriptors are independent of the cell structure of the network, need not rely on information being exchanged with the network.

Continuing with the example of FIG. 13, the UE at instance 1 stores the area descriptor (e.g., the "map" of the current area), and the UE frequently, even continuously, compares the area descriptor and the present location. At instance 2, the UE will thus be able to determine that it has left area 1402, and the UE can then generate a new event with a new data object request—in this example, the requested data object will be returned as a location-specific phonepage, along with an area descriptor, for area 1404.

It should be appreciated that not all areas may have corresponding phonepages. If, for example, the UE leaves area 1404 and enters area 1406 at instance 3, and area 1406 does not have a corresponding phonepage, the data object request may return only an area descriptor or "map" for area 1406. The UE can then subsequently request a new data object upon leaving area 1406.

If the UE includes an identification of how it determined its own location, or the granularity of its calculations, the boundaries or maps stored in server 130 can be adjusted appropriately. If the type of triggering event (e.g., an outgoing or incoming call has just been initiated or terminated) is identified by the UE in the data object request, the data server can adjust the timing of the transmission of the returned data object and area descriptor. Such an embodiment may be useful where the triggering event is that a call is being placed by the subscriber associated with the UE.

Numerous other implementations and advantages are possible. For example, the user or subscriber associated with the UE may pre-select the types of information (e.g., traffic information while in a "home" city, and city event information when in another city) to be included in the returned data object. Because the present invention allows both the type of information and the geographic areas to be varied independent of the network structure, virtually infinite possibilities for customization can be implemented. Such possibilities can include identifying friends or acquaintances (previously identified by the subscriber and/or the acquaintances) in an area. Also, the UE can provide an identity along with the location information in a data object request, where the identity is a secret identity, thus allowing the subscriber to receive personalized information without revealing a true identity.

Numerous advantages can be achieved by various embodiments of the present invention. In another example where an A-party's UE can provide, in addition to its location information, secondary information, the secondary information can include one or more telephone numbers stored in a directory or other codes indicative of a type or category of information of interest to the user to the data object server. By transmitting this type of information along with the data object request to the data object server, the data server can find a corresponding data object specified by the telephone number or other secondary information, and return this information to the UE. One practical example of this embodiment can be illustrated by an individual user who has programmed in the UE a telephone number for a particular restaurant in a home area. When the user travels to another geographic area, the data object request (whether automatically based on previously-programmed instructions, or manually) can include an indication of the restaurant type, and the data object server can make a database inquiry to determine whether a corresponding restaurant is located in the same geographic area. If so, the results of the database inquiry (e.g., the name, address, and/or telephone number of one or more restaurants serving similar cuisine, or the address and/or telephone number of a second location of the same restaurant stored in the UE) can be provided to the user. An exemplary database inquiry formed in and by the data object server could include "service=restaurant; restaurant type=japanese; restaurant name=sushi". It will be appreciated that the search can be performed such that the search results can be limited to exact matches, or include closest available matches. A user dissatisfied with the results of such a database inquiry can manually resubmit an expanded inquiry for a variant of the area-specific information returned to the UE by an initial query. Typically, such a variant will be broader in scope than the area-specific information provided as a result of the initial query.

An example of an expanded inquiry can be illustrated by a user who is traveling by car and who has relatively little fuel left in the fuel tank. An initial data object request (which may be initiated automatically based on a triggering event or manually requested by the user) may result in a database query for a specific brand of gasoline (e.g., "Texaco" or some other brand for which the user has a credit card or otherwise prefers). If the returned data object and/or search results do not provide any suitable matches, the user can manually cause a second data object request to be sent to the data object server, where the second data object request is formed to cause the data object server to perform an expanded query for any gas station, independent of brand name.

While the foregoing description includes numerous details and specificities, it is to be understood that these are provided for purposes of explanation only, and are not intended to limit the scope of the invention. Those of ordinary skill in the art will easily be able to make numerous modifications to the exemplary embodiments described above without departing from the scope of the invention, as defined by the following claims and their legal equivalents.

What is claimed is:

1. A method for presenting information to a mobile communication device, comprising:
   receiving, at an external server, a data object request from the mobile communication device, the data object request including location data and a first parameter identifying a kind of trigger event that triggered the data object request at the mobile communication device;
   determining, at the external server, a location area for the mobile communication device based on the location data; and
   providing to the mobile communication device a data object containing area-specific information for the determined location area, wherein the content of the data object depends upon the identified trigger event.

2. The method of claim 1, wherein the location data includes an identification of a method used to determine a location of the mobile communication device, and wherein determining the location area is further based on the identification of the method.

3. The method of claim 1, wherein the location data includes a granularity indication for a location of the mobile communication device, and wherein determining the location area is further based on the granularity indication.

4. The method of claim 1, wherein the data object request includes an identity of the mobile communication device, and the area-specific information is customized based on the identity of the mobile communication device.

5. The method of claim 1, wherein the first parameter of the data object request identifies a trigger event related to a call session at the mobile communication device.

6. The method of claim 5, wherein the data object request further includes a second parameter indicating a capability of the mobile communication device, and wherein the data object is adapted according to the indicated capability.

7. The method of claim 1, wherein the location area is independent of a structure of a mobile communication system which services the mobile communication device.

8. The method of claim 1, wherein the data object includes an area descriptor.

9. The method of claim 1, wherein the data object includes one or more of an Internet web page and an Internet web page address.

10. The method of claim 1, wherein the data object includes a WAP page.

11. The method of claim 1, further comprising the step of forming a URL based on the location data prior to the step of providing the data object.

12. The method of claim 1, wherein the area-specific information includes schedule information for one or more events taking place in the location area.

13. The method of claim 1, wherein the area-specific information includes vehicle traffic information for the location area.

14. The method of claim 1, wherein the area-specific information includes an identification of predetermined persons located in the location area or in an adjacent or overlapping specific area.

15. The method of claim 1, wherein the area-specific information includes one or more types of information specified by a user associated with the mobile communication device.

16. The method of claim 1, wherein the step of providing is performed during an idle time of the mobile communication device.

17. The method of claim 1, wherein the area-specific information includes a cookie.

18. A method for receiving area-specific information at a mobile communication device, comprising:
   detecting, at a mobile communication device, an event based on a call between the mobile communication device and a second party;
   generating a data object request based on the detected event, the data object request including location data corresponding to a particular location area and a first parameter identifying a kind of event that triggered the data object request;
   transmitting the data object request to a data server; and
   receiving, at the mobile communication device, a data object including area-specific information based on the location data and corresponding to the identified trigger event.

19. The method of claim 18, wherein the area-specific information includes an area descriptor, and wherein the method further comprises the step of displaying the area-specific information on a display associated with the mobile communication device.

20. The method of claim 19, further comprising the steps of comparing the area descriptor of the area-specific information with the location data, and transmitting new location data when the step of comparing reveals that the location data no longer corresponds to the area descriptor.

21. The method of claim 18, wherein the data object request further includes an identification of a method used to determine a location of the mobile communication device.

22. The method of claim 18, wherein the step of transmitting is performed during an idle time of the mobile communication device.

23. The method of claim 18, wherein the data object request further includes an identity of the mobile communication device, and the area-specific information is customized based on the identity of the mobile communication device.

24. The method of claim 23, wherein the identity is a secret identity.

25. The method of claim 24, wherein the secret identity is defined by a user associated with the mobile communication device.

26. The method of claim 18, wherein the data object includes one or more of an Internet web page and an Internet web page address.

27. The method of claim 18, wherein the data object includes a WAP page.

28. The method of claim 18, wherein the area-specific information includes vehicle traffic information for an area corresponding to the area-specific information.

29. The method of claim 18, wherein the area-specific information includes an identification of predetermined persons located in the same specific area.

30. The method of claim 18, wherein the area-specific information includes one or more types of information specified by a user associated with the mobile communication device.

31. The method of claim 18, wherein the data object request includes an indication of device activity, and wherein the step of receiving is performed during an idle time of the mobile communication device.

32. The method of claim 18, wherein the area-specific information includes a cookie.

33. The method of claim 18, wherein the location area is independent of a structure of the mobile communication system.

34. The method of claim 18, further comprising transmitting a second data object request from the mobile communication device to the data server, the second data object request including a request for a variant of the area specific information.

35. The method of claim 34, wherein the variant includes second area-specific information of a broader scope.

36. The method of claim 18, wherein the data object request includes secondary information in addition to the location data.

37. The method of claim 36, wherein the secondary information includes a code corresponding to a particular type of information, and wherein the provided data object includes area-specific information corresponding to the code.

* * * * *